United States Patent
Saito

(10) Patent No.: US 7,634,143 B2
(45) Date of Patent: Dec. 15, 2009

(54) IMAGE PROCESSING APPARATUS AND METHOD, RECORDING MEDIUM, AND PROGRAM

(75) Inventor: Yasushi Saito, Saitama (JP)

(73) Assignee: Sony Corporation, Tokyo (JP)

( * ) Notice: Subject to any disclaimer, the term of this patent is extended or adjusted under 35 U.S.C. 154(b) by 972 days.

(21) Appl. No.: 11/122,178

(22) Filed: May 4, 2005

(65) Prior Publication Data
US 2005/0265453 A1 Dec. 1, 2005

(30) Foreign Application Priority Data
May 7, 2004 (JP) ............... 2004-137975

(51) Int. Cl.
G06K 9/00 (2006.01)
G06K 9/46 (2006.01)
G06K 9/62 (2006.01)

(52) U.S. Cl. ............... 382/225; 382/107; 382/103; 382/190; 348/155

(58) Field of Classification Search ......... 382/190, 382/103, 107, 225; 348/155
See application file for complete search history.

(56) References Cited

U.S. PATENT DOCUMENTS 7,142,600 B1 * 11/2006 Schonfeld et al. ...... 375/240.16
7,260,148 B2 * 8/2007 Sohm .................. 375/240.16
2006/0152590 A1 * 7/2006 Kage et al. ............ 348/208.1

FOREIGN PATENT DOCUMENTS

| JP | 58-085684 | 5/1983 |
|---|---|---|
| JP | 04-180371 | 6/1992 |
| JP | 06-333049 | 12/1994 |
| JP | 07-038800 | 2/1995 |
| JP | 08-084352 | 3/1996 |
| JP | 2000-339475 | 12/2000 |

* cited by examiner

Primary Examiner—Brian P Werner
Assistant Examiner—Kathleen S Yuan
(74) Attorney, Agent, or Firm—Finnegan, Henderson, Farabow, Garrett & Dunner, L.L.P.

(57) ABSTRACT

An image processing apparatus that performs image processing on a first image and a second image includes a dividing unit dividing the first image into a plurality of blocks; a first motion-vector calculator calculating first motion vectors representing movements from the blocks of the first image to corresponding regions of the second image; a second motion-vector calculator calculating second motion vectors representing movements of the blocks that occur when the blocks are transformed based on a first positional-relationship parameter representing positional relationship between the first image and the second image; a difference-vector calculator calculating difference vectors representing differences between the first motion vectors and the second motion vectors; and an extracting unit extracting blocks including a moving object or blocks including a non-moving object based on distribution density of end points of the difference vectors.

9 Claims, 15 Drawing Sheets

IMAGE PROCESSING APPARATUS AND METHOD, RECORDING MEDIUM, AND PROGRAM

CROSS REFERENCES TO RELATED APPLICATIONS

The present invention contains subject matter related to Japanese Patent Application JP 2004-137975 filed in the Japanese Patent Office on May 7, 2004, the entire contents of which are incorporated herein by reference.

BACKGROUND OF THE INVENTION

1. Field of the Invention

The present invention relates to image processing apparatuses and methods, recording media, and programs. Particularly, the present invention relates to an image processing apparatus and method, a recording medium, and a program that allow accurate extraction of, for example, a region including a moving object.

2. Description of the Related Art

When a user captures an image by a camera, such as a digital video camera or a digital still camera, if the user captures an image with the camera held by hands instead of fixing the camera by a tripod, the image captured (hereinafter simply referred to as the image) could look to be shaky, i.e., the effect of camera shake due to movement (shake) of the camera with respect to an object could occur.

In order to alleviate the effect of camera shake on the image, with regard to a plurality of images continuously captured, using an image as a reference image, parameters representing movement of another image as a whole with respect to the reference image are calculated, and the another image is corrected using the parameters (i.e., the position is adjusted with reference to the reference image). This process is referred to, for example, as camera-shake correction.

The parameters representing movement of another image as a whole with respect to the reference image can be considered as parameters representing positional relationship between the reference image and the another image. The reference image is referred to for the purpose of adjusting (correcting) position. Another image whose position is corrected with respect to the reference image will be referred to as a target image.

Image components that occur between a reference image and a target image due to the effect of camera shake can be generally classified into a component of horizontal movement, which occurs when a camera directed to an object shifts horizontally, and a component of rotation centered about an optical axis of a lens, which occurs when the camera rotates clockwise or counterclockwise. More strictly speaking, a component of rotation about an axis that is perpendicular to the optical axis of the camera lens, or an enlarging or reducing component due to movement in the depth direction of the camera also exist.

Positions in the reference image and target image including the effect of camera shake are adjusted, for example, by affine transformation. Thus, as parameters representing positional relationship between the reference image and the target image, for example, affine parameters for affine transformation can be used.

In affine transformation, a position (x, y) in the reference image and a position (x', y') in the target image are expressed by expression (1) below.

$$\begin{pmatrix} x' \\ y' \end{pmatrix} = \begin{pmatrix} a & b \\ c & d \end{pmatrix} \begin{pmatrix} x \\ y \end{pmatrix} + \begin{pmatrix} s \\ t \end{pmatrix} \quad (1)$$

In expression (1), for example, when $a=K \times \cos\theta$, $b=-K \times \sin\theta$, $c=K \times \sin\theta$, and $d=K \times \cos\theta$, the left-hand side of expression (1) represents affine transformation for rotation by an angle $\theta$, horizontal movement by (s, t), and enlarging or reducing by K with respect to the position (x, y).

In the following description, the matrix (a, b, c, d) of affine transformation and the two-dimensional vector (s, t) in expression (1) will be collectively denoted as affine parameters (a, b, c, d, s, t).

The affine parameters are calculated, for example, by dividing the reference image into a plurality of blocks and detecting motion vectors of the blocks. That is, for example, affine parameters (a, b, c, d, s, t) in expression (1) are determined so as to minimize the sum of square errors between a position (x", y") determined by moving the position (x, y) of each pixel of the reference image onto the target image based on the motion vectors of the blocks of the reference image and a position (x', y') determined by transforming the position (x, y) to a position on the target image according to expression (1).

However, when a moving object is included in the reference image and the target image, generally, the movement (motion vector) of the moving object in the image differs from movement of the image as a whole caused by camera shake. Thus, when pixels in a region of the moving object are used to calculate the affine parameters (a, b, c, d, s, t), it is difficult to obtain accurate affine parameters (a, b, c, d, s, t) due to the effect of the movement of the moving object.

Thus, when a moving object is included in an image, a region of the moving object is extracted and removed, and affine parameters (a, b, c, d, s, t) representing movement of the image as a whole caused by camera shake are calculated using only the remaining region other than the region of the moving object.

For example, Japanese Unexamined Patent Application Publication No. 07-038800 proposes techniques for removing a region including a moving object to correct the effect of camera shake.

According to Japanese Unexamined Patent Application Publication No. 07-038800, when detecting movement of an image as a whole, the image is divided into a plurality of blocks, and only motion vectors with respect to the horizontal direction and motion vectors with respect to the vertical direction of the respective blocks are considered.

That is, according to Japanese Unexamined Patent Application Publication No. 07-038800, an entire image is divided into four regions, and each of the four regions is further divided into a plurality of blocks. Then, a motion vector V is calculated for each of the blocks of each of the four regions.

Furthermore, in each of the four regions, the sum $\Sigma(|V_{Xi}-V_{XAVR}|+|V_{Yi}-Y_{YAVR}|)$ for all the blocks of the sum of the absolute value $|V_{Xi}-V_{XAVR}|$ of the difference between a value $V_{Xi}$ of the motion vector V of each block with respect to the horizontal direction and an average $V_{XAVR}$ of the motion vectors V of all the blocks with respect to the horizontal direction and the absolute value $|V_{Yi}-V_{YAVR}|$ of the difference between a value $V_{Yi}$ of the motion vector V of each block with respect to the vertical direction and an average $V_{YAVR}$ of the motion vectors V of all the blocks with respect to the vertical direction is calculated as exitance.

Of the respective exitance values of the four regions, two regions with smaller exitance values are selected, and an average of the motion vectors V of the two selected regions is calculated as a motion vector of the image as a whole, i.e., a parameter representing movement of the image as a whole. That is, of the respective exitance values of the four regions, two regions with larger exitance values are considered as regions including a moving object and excluded from calculation of a parameter representing movement of the image as a whole.

SUMMARY OF THE INVENTION

According to the method of Japanese Unexamined Patent Application Publication No. 07-038800, however, for example, when a user images a still object (i.e., a non-moving object) not including a moving object, if a component of rotation about the optical axis of the lens occurs due to camera shake, a motion vector attributable to the rotation due to camera shake is substantially 0 when the still object is in the proximity of the center of rotation in the image, but the motion vector has a certain magnitude when the still object is remote from the center of the image. In this case, a region where the motion vector has a certain magnitude, even if an object included in the region is a still object, is considered as a region including a moving object and is excluded.

As described above, when a region including a still object is removed when calculating a parameter representing movement of an image as a whole, the accuracy of the parameter is degraded.

It is desired that, for example, a region including a moving object in an image be extracted accurately.

An image processing apparatus according to an embodiment of the present invention performs image processing on a first image and a second image. The image processing apparatus includes dividing means for dividing the first image into a plurality of blocks; first motion-vector calculating means for calculating first motion vectors representing movements from the blocks of the first image to corresponding regions of the second image; second motion-vector calculating means for calculating second motion vectors representing movements of the blocks that occur when the blocks are transformed based on a first positional-relationship parameter representing positional relationship between the first image and the second image; difference-vector calculating means for calculating difference vectors representing differences between the first motion vectors and the second motion vectors; and extracting means for extracting blocks including a moving object or blocks including a non-moving object based on distribution density of end points of the difference vectors.

The image processing apparatus may further include positional-relationship-parameter calculating means for calculating a second positional-relationship parameter representing positional relationship between the first image and the second image using the blocks including the non-moving object, extracted by the extracting means.

The image processing apparatus may further include updating means for updating the first positional-relationship parameter by the second positional-relationship parameter calculated by the positional-relationship-parameter calculating means. In that case, the second motion-vector calculating means calculates second motion vectors representing movements of the blocks that occur when the blocks are transformed using the first positional-relationship parameter updated by the updating means, the difference-vector calculating means calculates difference vectors representing differences between the first motion vectors and the second motion vectors, the extracting means extracts blocks including the non-moving object based on distribution density of end points of the difference vectors, the positional-relationship-parameter calculating means calculates the second positional-relationship parameter using the blocks extracted by the extracting means, the updating means updates the first positional-relationship parameter by the second positional-relationship parameter calculated by the positional-relationship-parameter calculating means, and these operations are repeated until a predetermined condition is satisfied.

The predetermined condition may be that a difference between the first and second positional-relationship parameters is not greater than a predetermined threshold.

The image processing apparatus may further include outputting means for outputting the second positional-relationship parameter calculated by the positional-relationship-parameter calculating means.

The extracting means may extract blocks associated with difference vectors whose end points are located in a region having a maximum distribution density of end points of difference vectors.

The image processing apparatus may further include region calculating means for calculating the region having the maximum distribution density of end points of difference vectors as a region where end points of difference vectors are concentrated.

The region where end points of difference vectors are concentrated may be a region of a circle centered at a specific point and having a specific radius.

The region where end points of difference vectors are concentrated may be a region of a circle centered at an origin.

An image processing method according to an embodiment of the present invention performs image processing on a first image and a second image. The image processing method includes the steps of dividing the first image into a plurality of blocks; calculating first motion vectors representing movements from the blocks of the first image to corresponding regions of the second image; calculating second motion vectors representing movements of the blocks that occur when the blocks are transformed based on a first positional-relationship parameter representing positional relationship between the first image and the second image; calculating difference vectors representing differences between the first motion vectors and the second motion vectors; and extracting blocks including a moving object or blocks including a non-moving object based on distribution density of end points of the difference vectors.

A recording medium according to an embodiment of the present invention has recorded thereon a computer-readable program that allows a computer to perform image processing on a first image and a second image. The program comprising the steps of dividing the first image into a plurality of blocks; calculating first motion vectors representing movements from the blocks of the first image to corresponding regions of the second image; calculating second motion vectors representing movements of the blocks that occur when the blocks are transformed based on a first positional-relationship parameter representing positional relationship between the first image and the second image; calculating difference vectors representing differences between the first motion vectors and the second motion vectors; and extracting blocks including a moving object or blocks including a non-moving object based on distribution density of end points of the difference vectors.

A program according to an embodiment of the present invention allows a computer to perform image processing on a first image and a second image. The program includes the steps of dividing the first image into a plurality of blocks; calculating first motion vectors representing movements from the blocks of the first image to corresponding regions of the second image; calculating second motion vectors representing movements of the blocks that occur when the blocks are transformed based on a first positional-relationship parameter representing positional relationship between the first image and the second image; calculating difference vectors representing differences between the first motion vectors and the second motion vectors; and extracting blocks including a moving object or blocks including a non-moving object based on distribution density of end points of the difference vectors.

According to the embodiments of the present invention, the first image is divided into a plurality of blocks, first motion vectors representing movements from the blocks of the first image to corresponding regions of the second image are calculated, second motion vectors representing movements of the blocks that occur when the blocks are transformed based on a first positional-relationship parameter representing positional relationship between the first image and the second image are calculated, difference vectors representing differences between the first motion vectors and the second motion vectors are calculated, and blocks including a moving object or blocks including a non-moving object are extracted based on distribution density of end points of the difference vectors.

According to the embodiments of the present invention, for example, a region including a moving object in an image can be accurately extracted.

DESCRIPTION OF THE PREFERRED EMBODIMENTS

Now, embodiments of the present invention will be described with reference to the drawings.

Figure 1:
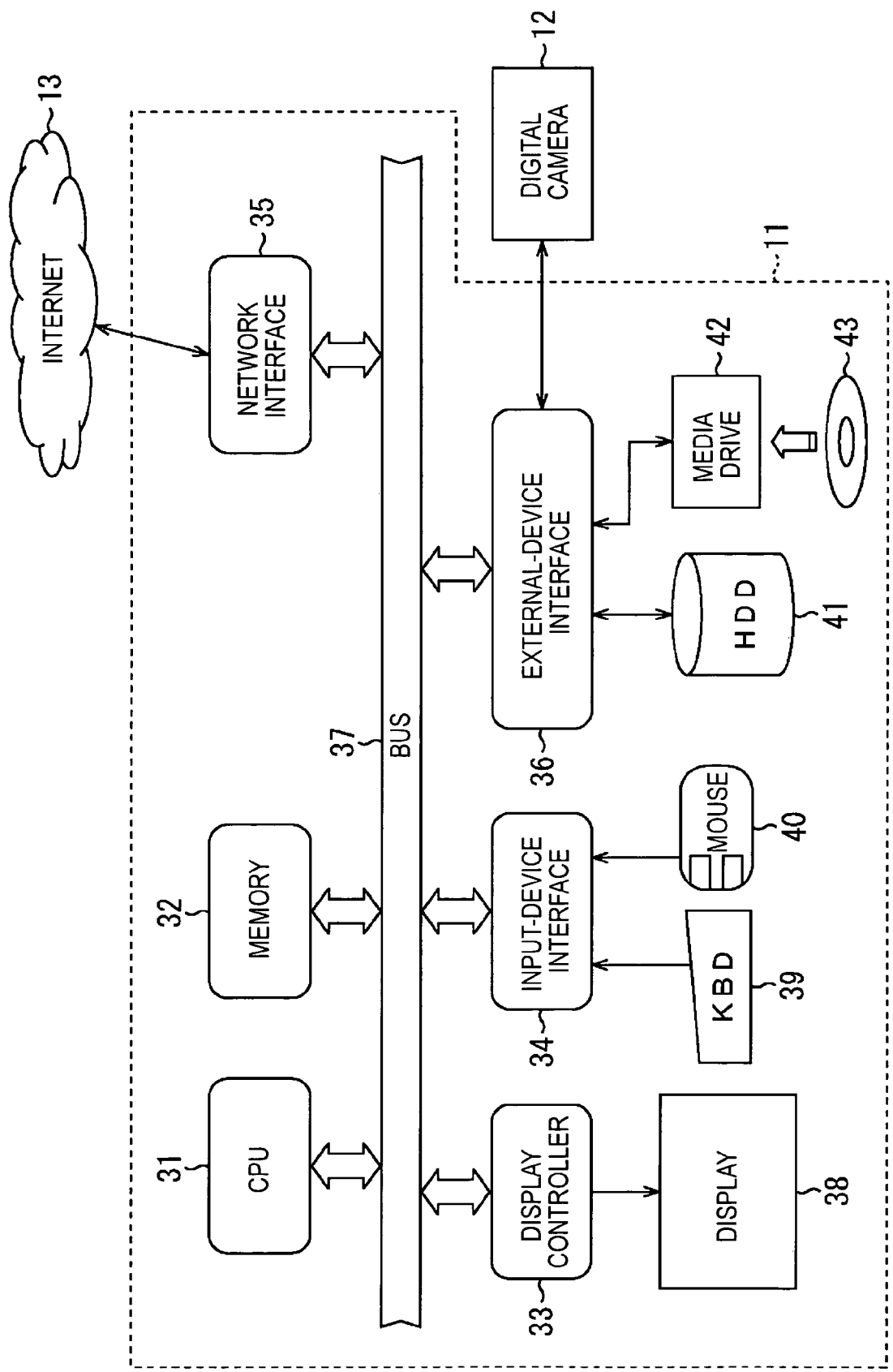
FIG. 1 is a block diagram showing an example construction of an image processing apparatus according to an embodiment of the present invention.

FIG. 1 shows an example construction of an image processing apparatus according to an embodiment of the present invention.

The image processing apparatus shown in FIG. 1 includes a computer 11, and a digital camera (digital video camera) 12 that supplies images to the computer 11. The computer 11 is connected to the Internet 13.

A central processing unit (CPU) 31, a memory 32, a display controller 33, an input-device interface 34, a network interface 35, and an external-device interface 36 are connected to each other via a bus 37.

The CPU 31 runs an operating system (OS) stored in a hard disk drive (HDD) 41, and runs various programs (application programs) under the control of the operating system. For example, the CPU 31 stores (saves) in the HDD 41 image data of a plurality of images supplied from the digital camera 12 via the external-device interface 36. Furthermore, the CPU 31, with a specific image among a plurality of images supplied from the digital camera 12 or stored in the HDD 41 as a target image and another image as a target image, calculates positional relationship between the reference image and the target image. This process will hereinafter be referred to as a positional-relationship calculating process. In the positional-relationship calculating process, when a moving object is included in the reference image or the target image, a region of the moving object in the image is extracted and removed, and affine parameters (a, b, c, d, s, t) representing positional relationship between the reference image and the target image are calculated using only regions of non-moving objects.

The memory 32 stores (loads) programs that are executed by the CPU 31, and temporarily stores working data used for processing by the CPU 31. The memory 32 may include both a non-volatile memory, such as a read-only memory (ROM), and a volatile memory, such as a dynamic random access memory (DRAM).

The display controller 33 displays images on the display 38 according to drawing instructions supplied from the CPU 31. More specifically, the display controller 33 obtains drawing data according to drawing instructions supplied from the CPU 31, and writes the drawing data to a frame buffer (not shown). The display 38 displays images based on the drawing data written to the frame buffer. Accordingly, the display 38 can display images stored in the HDD 41 or images obtained by processing images stored in the HDD 41 by the CPU 31 so that a user can view the images displayed on the display 38.

The input-device interface 34 is connected to a keyboard (KBD) 39 and a mouse 40. By operating the keyboard 39 or the mouse 40, for example, a command for displaying an image on the display 38 or a command for executing image processing can be input. The input-device interface 34 supplies signals corresponding to such operations, supplied from the keyboard 39 or the mouse 40, to the CPU 31 via the bus 37.

The network interface 35 is implemented, for example, by an asymmetric digital subscriber line (ADSL) modem or a network interface card (NIC). The network interface 35 controls communications with wide area networks, such as the Internet 13, and local area networks, such as Ethernet networks.

On networks such as the Internet 13, a plurality of computers (not shown) called host terminals or servers is transparently connected to each other, whereby a distributed computing environment is implemented. The servers or the like on the networks are capable of providing, for example, services of distributing software (programs), content data, or the like to users. The computer 11 is allowed to download, for example, an image captured by another person to the HDD 41 from a server on the Internet 13 via the network interface 35.

The external-device interface 36 is connected to external devices, such as the digital camera 12, the HDD 41, and the media drive 42. The external-device interface 36 controls exchange of data with the digital camera 12, the HDD 41, and the media drive 42.

The HDD 41 is a storage device (recording device) that includes a magnetic disk as a recording medium and that allows random access. The HDD 41 is advantageous in terms of storage capacity, data transfer rate, and so forth.

On the HDD 41, various programs in executable forms are installed (stored). For example, an operating system program, application programs, device drivers, and other programs that are to be executed by the CPU 31 are stored on the HDD 41 in a non-volatile manner.

In this embodiment, as described earlier, the computer 11 executes the positional-relationship calculating process for calculating affine parameters (a, b, c, d, s, t) representing positional relationship between a reference image and a target image. A program for executing the positional-relationship calculating process is also stored (installed) on the HDD 41.

On the media drive 42, a portable disk 43, such as a compact disc (CD), a magneto-optical disc (MO), or a digital versatile disc (DVD), is loaded. The media drive 42 accesses a data recording surface of the disk 43 to read programs or data recorded thereon, or writes (records) data or the like supplied from the external-device interface 36 to the disk 43.

The disk 43 is mainly used to back up programs or data, or to transfer programs or data for the purpose of sales, circulation, distribution, or the like. Thus, the program for executing the positional-relationship calculating process for calculating positional relationship between a reference image and a target image can be recorded on the disk 43 for sales or other purposes.

The computer 11 constructed as described above executes the positional-relationship calculating process, for example, on a plurality of images sequentially captured and supplied from the digital camera 12, or a plurality of images stored in the HDD 41. That is, the computer 11 uses a specific image as a reference image and another image as a target image to calculate affine parameters (a, b, c, d, s, t) representing positional relationship between the reference image and the target image.

Then, the computer 11 transforms the target image using the affine parameters (a, b, c, d, s, t) to obtain position information of a corrected image of the target image with respect to the reference image, for example, coordinate values of the four corners of the target image on the reference image, as information for correcting the effect of camera shake, supplying (outputting) the information to the digital camera 12 or the like via the external-device interface 36.

The computer 11 can be implemented, for example, by a compatible or successor of IBM's personal computer called "PC/AT (Personal Computer/Advanced Technology)". Obviously, the computer 11 may be implemented by a computer having a different architecture. A component that is similar to the computer 11 may be included in the digital camera 12. In that case, the positional-relationship calculating process, correction of the effect of camera shake using affine parameters (a, b, c, d, s, t) obtained by the positional-relationship calculating process, and so forth are executed in the digital camera 12.

Next, the positional-relationship calculating process executed by the computer 11 will be described more specifically.

Figure 2B:
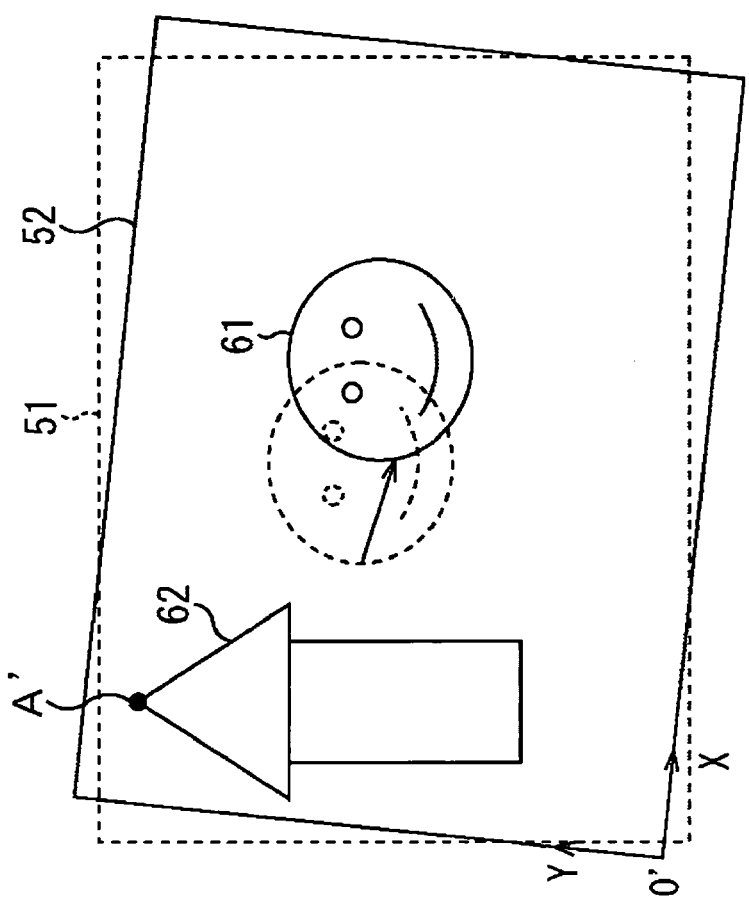
FIGS. 2A and 2B are diagrams showing a reference image and a target image.
Figure 2A:
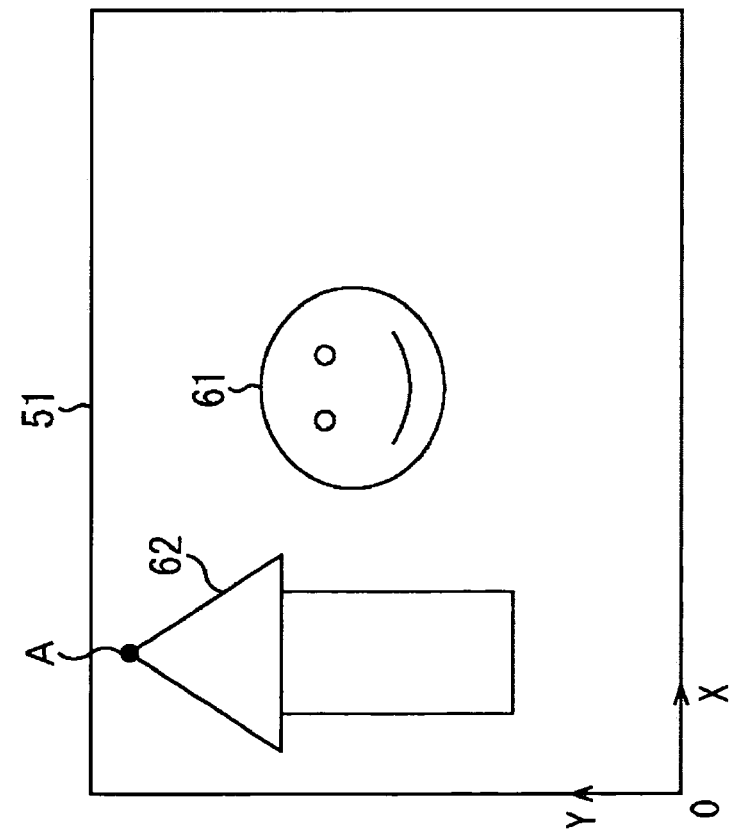

FIGS. 2A and 2B show a reference image 51 and a target image 52.

As for the reference image 51, an XY coordinate system with the X direction extending rightward and the Y direction extending upward and the origin O located at the bottom left corner of the reference image 51 is defined as a coordinate system for the reference image 51. As for the target image 52, an XY coordinate system is similarly defined with the bottom left corner of the target image 52 as the origin O'.

The reference image 51 and the target image 52 shown in FIGS. 2A and 2B are, for example, temporally successive images captured by the digital camera 12, or captured at a high speed by a digital still camera or the like. The image captured earlier is used as the reference image 51, and the image captured later is used as the target image 52.

In the reference image 51 and the target image 52, an object 61 as a target of imaging and a background 62 behind the object 61 are projected (displayed). The object 61 changes its position between when the reference image 51 is captured and when the target image 52 is captured, i.e., the object 61 is a moving object.

The position of the object 61 in the target image 52 with respect to the origin O' is different from the position of the object 61 in the reference image 51 with respect to the origin O. Also, the position of the background 62 in the target image 52 with respect to the origin O' is different from the position of the background 62 in the reference image 51 with respect to the origin O.

In the positional-relationship calculating process, affine parameters (a, b, c, d, s, t) expressed by expression (1) given earlier, representing positional relationship between a position (x, y) on the reference image 51 and a position (x', y') on the target image 52 corresponding to a shift caused by camera shake, is calculated.

In the example of the reference image 51 and the target image 52 shown in FIGS. 2A and 2B, for example, the computer 11 calculates affine parameters (a, b, c, d, s, t) representing positional relationship between the position (x, y) of a point A on the reference image 51 and the position (x', y') of a corresponding point A' on the target image 52.

However, the shift between the corresponding positions of the reference image 51 and the target image 52 can be attributable to the effect of camera shake alone as in the case of the positional relationship between corresponding points of the background 62, or attributable to both the effect of camera shake and the movement of the object 61 as in the case of the positional relationship between corresponding points of the object 61. Thus, when affine parameters (a, b, c, d, s, t) are calculated using the entire reference image 51 and target image 52, affine parameters (a, b, c, d, s, t) affected by the shift due to the movement of the object 61 are obtained.

Based on what has been described above, when calculating affine parameters (a, b, c, d, s, t) representing positional relationship between images, associated with only the shift due to the effect of camera shake, data at each position (region) where the moving object 61 is displayed among the positions (regions) of the images is to be removed.

Thus, in the positional-relationship calculating process, the computer 11 executes a process for removing regions of a moving object from images.

Figure 3:
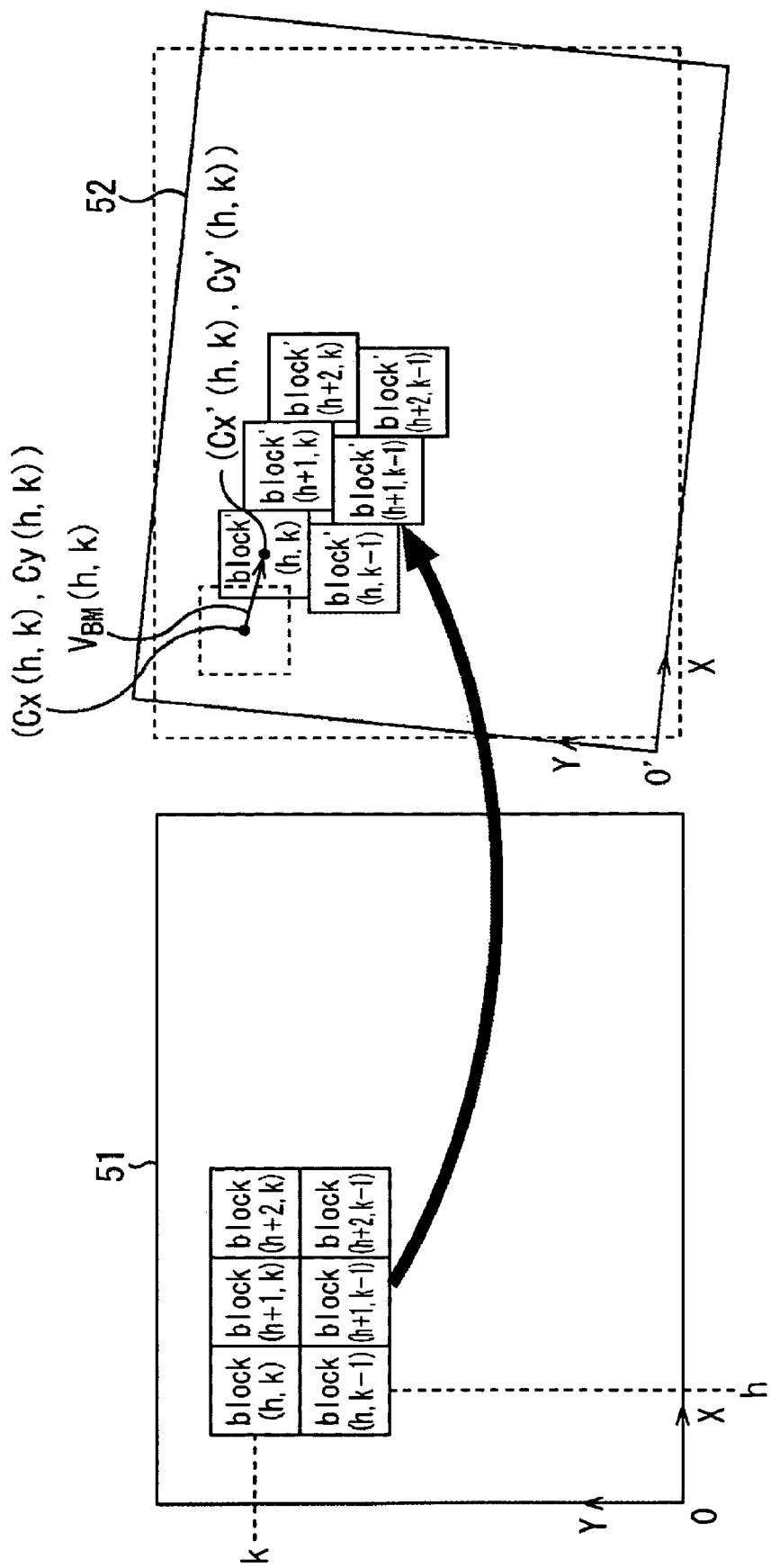
FIG. 3 is a diagram for explaining block matching.

That is, in the positional-relationship calculating process, the computer 11 first divides the reference image 51 into a plurality of blocks blk, as shown in FIG. 3. Alternatively, the reference image 51 and the target image 52 may be reduced by an appropriate reducing ratio, dividing the reduced reference image 51 into a plurality of blocks blk.

Of the blocks blk of the reference image 51, a block that is (h+1)-th from the left in the X direction and (k+1)-th from the bottom in the Y direction will be denoted as a block blk(h, k).

The center position of the block blk(h, k) will be denoted as (Cx(h, k), Cy(h, k)). Cx(h, k) and Cy(h, k) denote X and Y coordinates, respectively.

In the positional-relationship calculating process, the computer 11, for each block blk(h, k) of the reference image 51, performs block matching to detect a corresponding region in the target image 52, i.e., a block blk'(h, k) having the same shape as the block blk(h, k).

For example, using a block blk(h, k) on the reference image 51 as a template, the computer 11 detects a region that is most similar (having highest degree of matching) to the block blk(h, k) from the target image 52. More specifically, for example, a region that minimizes the sum of square errors of pixel values of the pixels of the block blk(h, k) and corresponding pixels of the region of the target image 52 having the same shape as the block blk(h, k) is detected from the target image 52 as a block blk'(h, k) corresponding to the block blk(h, k).

The center position of the block blk'(h, k) will be denoted as (Cx'(h, k), Cy'(h, k)).

Next, in the positional-relationship calculating process, the computer 11 calculates a motion vector $V_{BM}$(h, k) representing movement of the center position (Cx(h, k), Cy(h, k)) of the block blk(h, k) on the reference image 51 to the center position (Cx'(h, k), Cy'(h, k)) of the block blk'(h, k) on the target image 52. (h, k) of the motion vector $V_{BM}$(h, k) indicates that the motion vector $V_{BM}$(h, k) is calculated for the block blk(h, k) on the reference image 51. When the position (h, k) of the block blk(h, k) need not be particularly identified, a motion vector is simply denoted as a motion vector $V_{BM}$. The X component and the Y component of the motion vector $V_{BM}$ will be denoted as $X_{BMX}$ and $Y_{BMY}$. The motion vector $V_{BM}$ obtained by block matching will be referred to as a matching motion vector $V_{BM}$ when appropriate.

The computer 11 calculates a motion vector $V_{BM}$(h, k) for every block blk(h, k) of the reference image 51. However, of the blocks blk(h, k) of the reference image 51, it is difficult to correctly detect blocks blk'(h, k) of the target image 52 corresponding to blocks blk(h, k) with little texture (small activity). Thus, such blocks blk(h, k) are excluded from block matching in advance. For example, blocks blk(h, k) whose variance of luminance values is not greater than a predetermined threshold $Th_{PV}$ are considered as blocks blk(h, k) with little texture and excluded from block matching.

In the positional-relationship calculating process, next, the computer 11 sets new affine parameters $P_{new}$ calculated using blocks blk(h, k) not including a moving object as current affine parameters $P_{cur} = (a_{cur}, b_{cur}, c_{cur}, d_{cur}, s_{cur}, t_{cur})$. Then, by affine transformation based on the current affine parameters $P_{cur} = (a_{cur}, b_{cur}, c_{cur}, d_{cur}, s_{cur}, t_{cur})$, the computer 11 calculates a motion vector $V_{GM}$(h, k) between the position after the transformation and the position before the transformation for each block blk(h, k) of the reference image 51 for which a matching block vector $V_{BM}$(h, k) has been obtained.

Immediately after the positional-relationship calculating process is started, new affine parameters $P_{new}$ have not been calculated, so that initial values of affine parameters are used as current affine parameters $P_{cur}$.

As the initial values $(a_0, b_0, c_0, d_0, s_0, t_0)$ of affine parameters, for example, affine parameters (1, 0, 0, 1, 0, 0) corresponding to a case where camera shake does not occur can be used. Alternatively, other appropriate values, if any, may be used as the initial values $(a_0, b_0, c_0, d_0, s_0, t_0)$ of affine parameters.

When a block blk(h, k) of the reference image 51 is affine-transformed using the affine parameters $(a_{cur}, b_{cur}, c_{cur}, d_{cur}, s_{cur}, t_{cur})$, he motion vector $V_{GM}$(h, k)=$(V_{GMX}, V_{GMY})$ representing movement between the position after the transformation and the position before the transformation can be expressed by expression (2) below in relation to the center position (Cx(h, k), Cy(h, k)) of the block blk(h, k).

$$\begin{pmatrix} V_{GMX} \\ V_{GMY} \end{pmatrix} = \begin{pmatrix} a_{cur} & b_{cur} \\ c_{cur} & d_{cur} \end{pmatrix} \begin{pmatrix} Cx(h,k) \\ Cy(h,k) \end{pmatrix} + \begin{pmatrix} s_{cur} \\ t_{cur} \end{pmatrix} - \begin{pmatrix} Cx(h,k) \\ Cy(h,k) \end{pmatrix} \quad (2)$$

For the purpose of distinction of the motion vector $V_{GM}$(h, k) from the matching motion vector $V_{BM}$(h, k), the motion vector $V_{GM}$(h, k) will be referred to as a transformation motion vector $V_{GM}$(h, k) when appropriate. When the position (h, k) of the block blk(h, k) need not be particularly identified, the transformation motion vector will be simply denoted as a transformation motion vector $V_{GM}$. The X component and the Y component of the transformation motion vector $V_{GM}$ will be denoted as $V_{GMX}$ and $V_{GMY}$.

In the positional-relationship calculating process, next, for each block blk(h, k) of the reference image 51, the computer 11 calculates a difference vector $V_D$(h, k)=$V_{BM}$(h, k)−$V_{GM}$(h, k) between the matching motion vector $V_{BM}$(h, k) and the transformation motion vector $V_{GM}$(h, k).

Figure 4A:
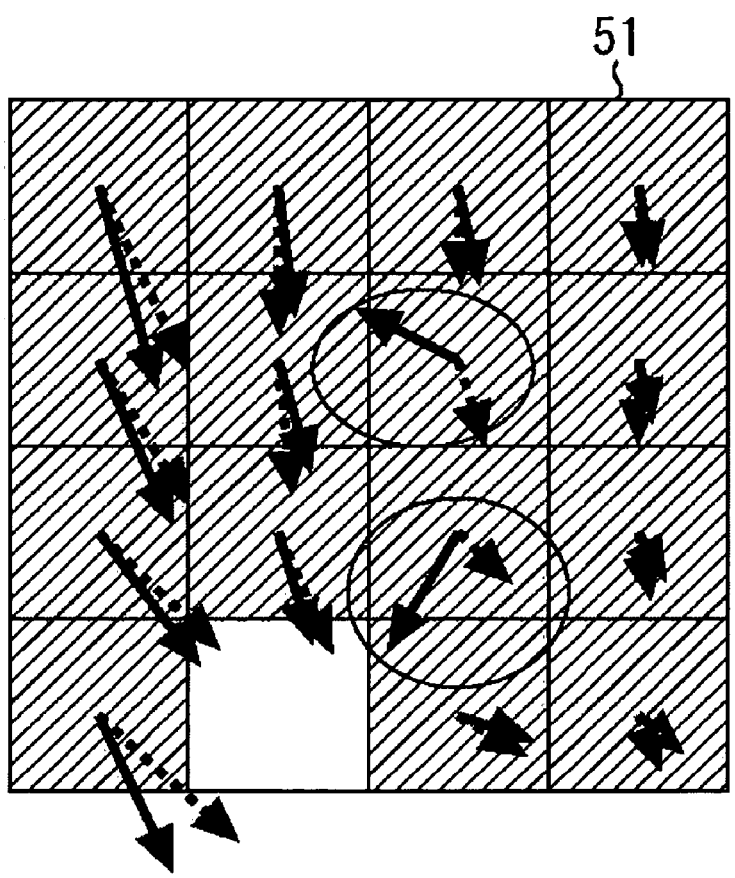
FIGS. 4A and 4B are diagrams for explaining difference vectors.

FIG. 4A shows an example where the computer 11 calculates a matching motion vector $V_{BM}$(h, k), a transformation motion vector $V_{GM}$(h, k), and a difference vector $V_D$(h, k) for each block blk(h, k) of the reference image 51. In the example shown in FIG. 4A, the reference image 51 is divided into 4×4 (horizontal×vertical) 16 blocks blk(h, k).

In FIG. 4A, a block blk(h, k) that is not hatched is a block considered as a block blk(h, k) having little texture and excluded from block matching, and blocks blk(h, k) that are hatched are blocks for which matching motion vectors $V_{BM}$ (h, k) have been obtained by block matching.

In FIG. 4A, a solid arrow starting from the center of a block blk(h, k) represents a matching motion vector $V_{BM}$(h, k) calculated from the reference image 51 and the target image 52. A dotted arrow starting from the center of a block blk(h, k) represents a transformation motion vector $V_{GM}$(h, k) calculated by affine transformation based on the current affine parameters $P_{cur}=(a_{cur}, b_{cur}, c_{cur}, d_{cur}, s_{cur}, t_{cur})$.

Figure 4B:
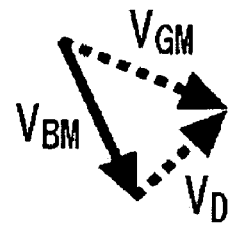

The difference vector $V_D$(h, k) of each block blk(h, k) is represented by a vector connecting the end of the matching motion vector $V_{BM}$(h, k) and the end of the transformation motion vector $V_{GM}$(h, k), for example, as shown in FIG. 4B.

When a moving object is not included in the block blk(h, k), if the current affine parameters $P_{cur}$ are adequately accurate, the matching motion vector $V_{BM}$(h, k) of the block blk(h, k) not including a moving object does not differ considerably from the transformation motion vector $V_{GM}$(h, k) calculated by affine transformation based on the current affine parameters $P_{cur}$, so that the magnitude of the difference vector $V_D$ is small. On the other hand, when a moving object is included in the block blk(h, k), the magnitude of the difference vector $V_D$ of the block blk(h, k) becomes larger due to the movement of the moving object.

In FIG. 4A, blocks blk(h, k) for which the magnitude of the difference vector $V_D$ is large are surrounded by circles.

In the positional-relationship calculating process, a process for removing a region of a moving object is executed. Thus, based on the difference vector $V_D$(h, k) obtained for each block blk(h, k), blocks blk(h, k) not including a moving object (i.e., blocks blk(h, k) for which only a shift due to the effect of camera shake occurs) or blocks blk(h, k) including a moving object are extracted (separated), and the blocks other than the blocks blk(h, k) not including a moving object, i.e., the blocks blk(h, k) including a moving object, are removed.

Now, first and second extracting methods for extracting blocks blk(h, k) including a moving object or blocks blk(h, k) not including a moving object based on the difference vector $V_D$(h, k) calculated for each block blk(h, k) of the reference image 51 will be described. In the following description, "all the blocks blk(h, k) of the reference image 51", when appropriate, refers to all the blocks blk(h, k) except for removed blocks blk(h, k) having little texture.

Now, a first extracting method will be described with reference to FIG. 5.

Figure 5:
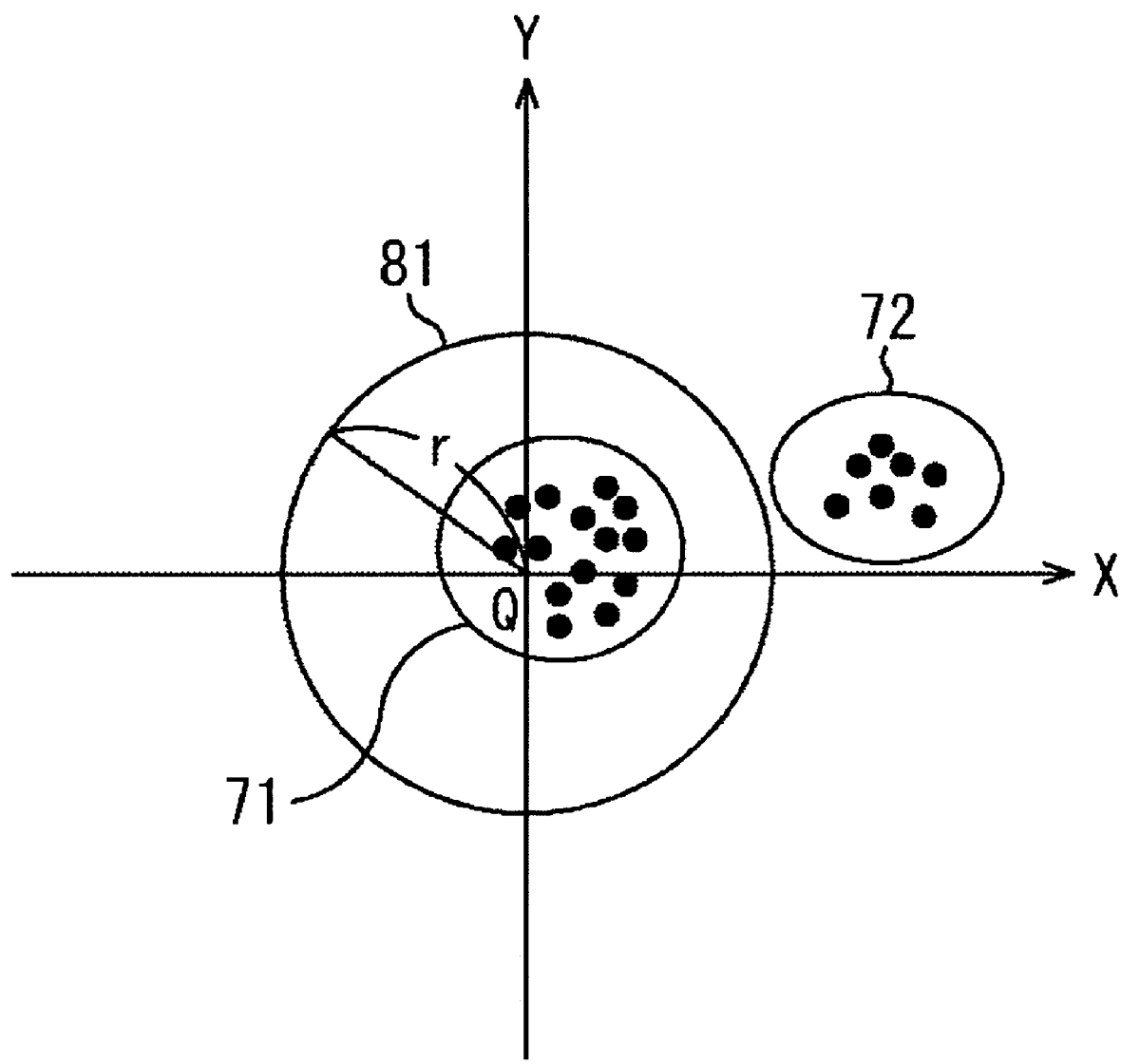
FIG. 5 is a diagram for explaining a first extracting method.

FIG. 5 shows an XY coordinate system where the end points of two-dimensional difference vectors $V_D$ of the reference image 51 are plotted. The X coordinates and Y coordinates of the end points of the difference vectors $V_D$ are equal to the X components and Y components of the difference vectors $V_D$, respectively.

The difference vectors $V_D$(h, k) of the blocks blk(h, k) not including a moving object are small when the current affine parameters $P_{cur}$ are adequately accurate. Thus, the distribution of the end points thereof is concentrated in a region 71 in the proximity of the origin.

In contrast, the difference vectors $V_D$(h, k) of blocks blk(h, k) including a moving object have certain magnitudes due to the effect of the movement of the moving object, so that the distribution of the end points thereof is concentrated in a region 72 somewhat distant from the origin.

Thus, for example, by setting a circle 81 having a radius r and a center Q at the origin so that the distribution of the end points of the difference vectors $V_D$ of the blocks blk(h, k) not including a moving object is concentrated therein, it is possible, using the circle 81 as a border, to extract the difference vectors $V_D$(h, k) whose end points are distributed inside the circle 81 as blocks blk(h, k) not including a moving object, and to extract the difference vectors $V_D$(h, k) whose end points are distributed outside the circle 81 as blocks blk(h, k) including a moving object. The radius r is chosen to be such a value that the end points of the difference vectors $V_D$(h, k) concentrated in the proximity of the origin are surrounded by the circle 81. The value can be determined, for example, by performing simulation.

When the amount of shift caused by camera shake between the reference image 51 and the target image 52 is extremely large, for example, due to a long time interval between the time when the reference image 51 is captured and the time when the target image 52 is captured, if the initial values ($a_0$, $b_0$, $c_0$, $d_0$, $s_0$, $t_0$) of affine parameters are set as the current affine parameters $P_{cur}$ and the initial values ($a_0$, $b_0$, $c_0$, $d_0$, $s_0$, $t_0$) of affine parameters are affine parameters (1, 0, 0, 1, 0, 0) corresponding to a case where camera shake does not occur, the current affine parameters $P_{cur}$ are not adequately accurate. That is, the current affine parameters $P_{cur}$ do not represent positional relationship between the reference image 51 and the target image 52 with an adequate accuracy. Thus, even in the case of difference vectors $V_D$(h, k) of blocks blk(h, k) not including a moving object, the end points thereof are not distributed in the proximity of the origin.

A measure to be taken in such cases will be described later.

Although blocks blk(h, k) not including a moving object are extracted using the circle 81 surrounding the end points of the difference vectors $V_D$(h, k) of blocks blk(h, k) not including a moving object in the example described above, instead of the circle 81, shapes other than the circle, such as an ellipse, a square, or a rectangle, may be used to extract blocks blk(h, k) not including a moving object.

Next, a second extracting method will be described.

In the second extracting method, the computer 11 calculates the magnitudes (scalar values) of the difference vectors $V_D$(h, k) of the respective blocks blk(h, k) of the reference image 51, and sorts the difference vectors $V_D$(h, k) in ascending order of the magnitudes of the difference vectors $V_D$(h, k). Hereinafter, the block blk(h, k) associated with the difference vector $V_D$(h, k) with i-th magnitude will be denoted as a block $blk_i$ (i=1, 2, . . . ) when appropriate.

Letting the magnitude of the difference vector $V_D$ of the block $blk_i$ be denoted as $|V_D|$, the magnitude $|V_D|$ of the difference vector $V_D$ of the block $blk_i$ can be calculated according to expression (3) below.

$$|V_D| = \sqrt{V_{DX}^2 + V_{DY}^2} \quad (3)$$

In expression (3), $V_{DX}$ denotes the X component of the difference vector $V_D$, and $V_{DY}$ denotes the Y component of the difference vector $V_D$.

Figure 6:
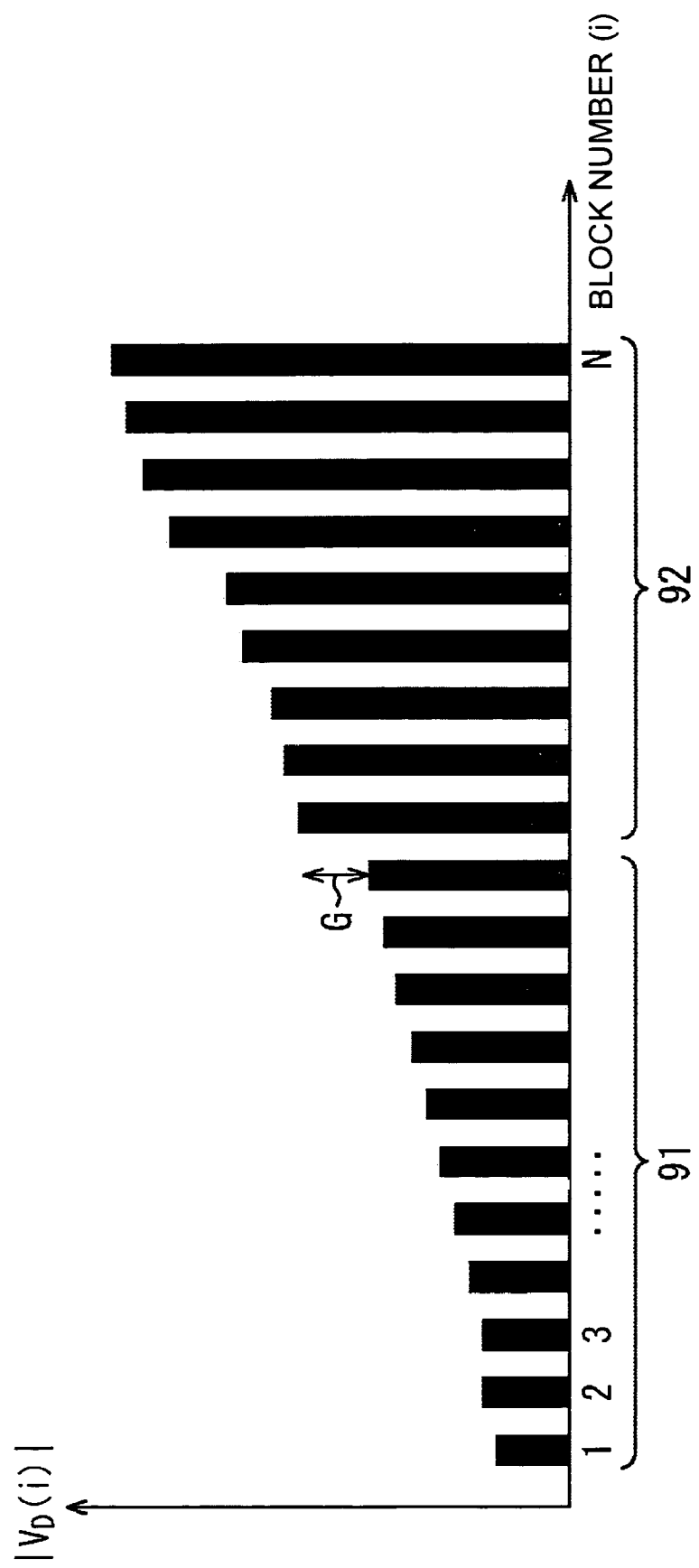
FIG. 6 is a diagram for explaining a second extracting method.

FIG. 6 is a graph showing the results of sorting the magnitudes $|V_D|$ of the difference vectors $V_D$. In FIG. 6, the number of blocks $blk_i$ in the reference image 51 for which difference vector $V_D$ have been calculated is N.

The horizontal axis of the graph shown in FIG. 6 represents the suffix i of the blocks $blk_i$ in the reference image 51 for which difference vectors $V_D$ have been calculated, and the suffix i will hereinafter be referred to as a block number i when appropriate. In the graph shown in FIG. 6, the magnitudes $|V_D(i)|$ of the difference vectors $V_D$ are arranged in ascending order from the left. The vertical axis represents the magnitudes $|V_D(i)|$ of the difference vectors $V_D$ of the blocks $blk_i$. $|V_D(i)|$ denotes the magnitude $|V_D|$ of the difference vector $V_D$ of the block $blk_i$ with the block number i.

As described with reference to FIGS. 4A and 4B, when a moving object is not included in the block blk(h, k), the magnitude $|V_D|$ of the difference vector $V_D$ of the block blk(h, k) is small. Thus, the magnitudes $|V_D|$ of blocks blk(h, k) not including a moving object appear earlier (left side in FIG. 6) when the magnitudes $|V_D|$ of blocks blk(h, k) are sorted in ascending order. On the other hand, the magnitudes $|V_D|$ of blocks blk(h, k) including a moving object appear later (right side in FIG. 6) when the magnitudes $|V_D|$ of blocks blk(h, k) are sorted in ascending order.

The magnitudes $|V_D(i)|$ of the difference vectors $V_D$ of blocks blk(h, k) including a moving object are large on average, and the magnitudes $|V_D(i)|$ of the difference vectors $V_D$ of blocks blk(h, k) not including a moving object are small on average. Thus, when the magnitudes $|V_D|$ of the difference vectors $V_D$ of blocks blk(h, k) are sorted in ascending order, a non-continuous step difference occurs between the magnitudes $|V_D|$ of the difference vectors $V_D$ of blocks blk(h, k) not including a moving object and the magnitudes $|V_D|$ of the difference vectors $V_D$ of blocks blk(h, k) including a moving object, as shown in FIG. 6.

Thus, by detecting the non-continuous step difference G shown in FIG. 6, it is possible to separate a block set 91 of blocks blk(h, k) not including a moving object and a block set 92 of blocks blk(h, k) including a moving object.

More specifically, the magnitudes $|V_D|$ of the difference vectors $V_D$ are sorted in ascending order, and each of the block numbers i thereof is sequentially selected as a subject number. Then, the magnitude $|V_D(i)|$ of the difference vector $V_D(i)$ of the subject number i is compared with the magnitude $|V_D(i+1)|$ of the difference vector $V_D(i+1)$ of the block number i+1 to detect the non-continuous step difference G, and blocks $blk_1$ to $blk_i$ not including a moving object or blocks $blk_{i+1}$ to $blk_N$ including a moving object can be extracted on the basis of the subject number i with which the step difference G is detected.

When the second extracting method is used, the computer 11 determines whether expression (4) holds for the subject number i. When expression (4) holds, the computer 11 extracts the blocks $blk_1$ to $blk_i$ with block numbers not greater than the subject number i as blocks not including a moving object, or extracts blocks $blk_{i+1}$ to $blk_N$ with block numbers greater than the subject number i as blocks including a moving object.

$$Th_G \leq |V_D(i+1)| - |V_D(i)| \quad (i=1, 2, \ldots, N-1) \quad (4)$$

$Th_G$ in expression (4) is a threshold value corresponding to the distance between the region 71 in the proximity of the origin and the region 72 somewhat distant from the origin in FIG. 5.

As described above, in the process for removing a region of a moving object, by the first or second extracting method, from the blocks blk(h, k) of the reference image 51 for which difference vectors $V_D$ have been calculated, blocks blk(h, k) not including a moving object or blocks blk(h, k) including a moving object are extracted, and the blocks blk(h, k) including a moving object (i.e., blocks other than the blocks blk(h, k) not including a moving object) are removed.

Then, in the positional-relationship calculating process, the computer 11, using only the remaining blocks not including the removed blocks blk(h, k) including a moving object, i.e., only the blocks blk(h, k) not including a moving object, calculates affine parameters (a, b, c, d, s, t) representing positional relationship between the reference image 51 and the target image 52, expressed by expression (1) given earlier.

That is, in the positional-relationship calculating process, the computer 11, using all the blocks blk(h, k) not including a moving object of the reference image 51, not including the removed blocks including a moving object, calculates affine parameters (a, b, c, d, s, t) so that transformation motion vectors $V_{GM}$ obtained by affine transformation based on the affine parameters (a, b, c, d, s, t) substantially coincide with matching motion vectors $V_{BM}$.

However, due to error in detecting the matching motion vectors $V_{BM}$ in block matching or other factors, it is difficult to obtain affine parameters (a, b, c, d, s, t) with which all the transformation motion vectors $V_{GM}$ of blocks blk(h, k) not including a moving object completely match the matching motion vectors $V_{BM}$.

Thus, in the positional-relationship calculating process, the computer 11, for example, by the least square method, calculates affine parameters (a, b, c, d, s, t) that minimize the sum of square errors between the transformation motion vectors $V_{GM}$ and the matching motion vectors $V_{BM}$ of all the blocks blk not including a moving object.

More specifically, the square errors between the transformation motion vectors $V_{GM}$ and the matching motion vectors $V_{BM}$ are equal to the difference vectors $V_D$ between the transformation motion vectors $V_{GM}$ and the matching motion vectors $V_{GM}$. Thus, in the positional-relationship calculating process, the computer 11 calculates affine parameters (a, b, c, d, s, t) that minimize the sum E of square errors expressed in expression (5).

$$\begin{aligned} E &= \sum |V_D|^2 \\ &= \sum (V_{DX}^2 + V_{DY}^2) \\ &= \sum ((V_{BMX} - V_{GMX})^2 + (V_{BMY} - V_{GMY})^2) \end{aligned} \quad (5)$$

$\Sigma$ in expression (5) denotes the sum regarding blocks blk(h, k) not including a moving object in the reference image 51, i.e., blocks blk(h, k) for which difference vectors $V_D$ have been calculated.

$V_{BMX}$ and $V_{BMY}$ in expression (5) respectively denote the X component and Y component of the matching motion vector $V_{BM}$(h, k) of each block blk(h, k), calculated from the reference image 51 and the target image 52, as described earlier.

$V_{GMX}$ and $V_{GMY}$ in expression (5) respectively denote the X component and Y component of the transformation motion vector $V_{GM}$(h, k), which can be expressed by expression (6) using affine parameters (a, b, c, d, s, t).

$$\begin{pmatrix} V_{GMX} \\ V_{GMY} \end{pmatrix} = \begin{pmatrix} a & b \\ c & d \end{pmatrix} \begin{pmatrix} Cx(h, k) \\ Cy(h, k) \end{pmatrix} + \begin{pmatrix} s \\ t \end{pmatrix} - \begin{pmatrix} Cx(h, k) \\ Cy(h, k) \end{pmatrix} \quad (6)$$

Cx(h, k) and Cy(h, k) in expression (6) denote the X coordinate and Y coordinate of the center of the block blk(h, k), respectively.

The affine parameters (a, b, c, d, s, t) that minimize the sum E of square errors in expression (5) can be calculated by obtaining an expression derived by partially differentiating the sum E of square errors with respect to the affine parameters (a, b, c, d, s, t) and solving an equation in which the expression yields 0.

The affine parameters (a, b, c, d, s, t) that minimize the sum E of square errors in expression (5) are set as affine parameters $P_{new} = (a_{new}, b_{new}, c_{new}, d_{new}, s_{new}, t_{new})$. The affine parameters $P_{new}$ are the new affine parameters $P_{new}$ described earlier.

In the positional-relationship calculating process, for example, the current affine parameters $P_{cur}$ are repeatedly updated with the new affine parameters $P_{new}$ and new affine parameters $P_{new}$ that minimize the sum E of square errors in expression (5) is repeatedly calculated until the new affine parameters $P_{new}$ become substantially equal to the current affine parameters $P_{cur}$, thereby obtaining accurate affine parameters (a, b, c, d, s, t) as the affine parameters $P_{new}$.

The new affine parameters $P_{new}$ can be considered to be substantially equal to the current affine parameters $P_{cur}$, for example, when expression (7) is satisfied.

$$(a_{cur}-a_{new})^2+(b_{cur}-b_{new})^2+(c_{cur}-c_{new})^2+(d_{cur}-d_{new})^2+ \\ (s_{cur}-s_{new})^2+(t_{cur}-t_{new})^2 \leq Th_P \quad (7)$$

Expression (7) is used to determine the degree of matching (degree of approximation) between the components of the affine parameters $P_{new}$ and the components of the current affine parameters $P_{cur}$. $Th_P$ in expression (7) is a predetermined threshold, and an appropriate value thereof can be chosen, for example, by performing simulation. Alternatively, the threshold $Th_P$ can be set according to an operation by a user.

Furthermore, the new affine parameters $P_{new}$ can be considered to be substantially equal to the current affine parameters $P_{cur}$ when expression (8) is satisfied, as well as when expression (7) is satisfied.

$$\sum |V_D|^2 \div Num = \\ \left[ \sum \left\{ \begin{pmatrix} V_{BMX} \\ V_{BMY} \end{pmatrix} - \begin{pmatrix} a_{cur} & b_{cur} \\ c_{cur} & d_{cur} \end{pmatrix} \begin{pmatrix} x \\ y \end{pmatrix} + \begin{pmatrix} s_{cur} \\ t_{cur} \end{pmatrix} \right\}^2 \right] \div Num \leq Th'p \quad (8)$$

Expression (8) is used to determine the degree of matching (degree of approximation) between the matching motion vectors $V_{BM}$ and the transformation motion vectors $V_{GM}$ calculated by affine transformation based on the new affine parameters $P_{new}$ for the blocks blk(h, k) not including a moving object in the reference image 51.

In expression (8), $\Sigma$ denotes the sum regarding blocks blk(h, k) not including a moving object in the reference image 51, and Num denotes the number of blocks blk(h, k) not including a moving object in the reference image 51.

Next, the positional-relationship calculating process executed by the computer 11 will be further described with reference to a flowchart shown in FIG. 7. The positional-relationship calculating process is started when a command for starting the positional-relationship calculating process is input by a user's operation, for example, from the keyboard 39 or the mouse 40. It is assumed herein that the computer 11 has already recognized (obtained) the reference image 51 and the target image 52 relevant to the positional-relationship calculating process.

First, in step S11, (the CPU 31 of) the computer 11 divides the reference image 51 into a plurality of blocks blk(h, k). Furthermore, in step S11, the computer 11 excludes blocks blk(h, k) with variance of luminance values less than a predetermined threshold among the plurality of blocks blk(h, k) of the reference image 51 from subsequent processing. The process then proceeds to step S12.

The reason why the blocks blk(h, k) with small variance of luminance values are excluded from block matching in step S11 is that the blocks blk(h, k) with small variance of luminance values are blocks blk(h, k) with little texture, for which accurate block matching is not possible. Steps subsequent to step S11 are executed only on blocks blk(h, k) not excluded in step S11.

In step S12, the computer 11 carries out block matching with the target image 52 using each of the blocks blk(h, k) of the reference image 51 not excluded in step S11 as a template, calculating a matching motion vector $V_{BM}$ for each block blk(h, k). The process then proceeds to step S13.

In step S13, the computer 11 initializes the current affine parameters $P_{cur}=(a_{cur}, b_{cur}, c_{cur}, d_{cur}, s_{cur}, t_{cur})$ The process then proceeds to step S14.

More specifically, in step S13, the computer 11 assigns the predetermined initial values $(a_0, b_0, c_0, d_0, s_0, t_0)$ (e.g., (1, 0, 0, 1, 0, 0)) of affine parameters to the current affine parameters $P_{cur}=(a_{cur}, b_{cur}, c_{cur}, d_{cur}, s_{cur}, t_{cur})$ The initial values $(a_0, b_0, c_0, d_0, s_0, t_0)$ of affine parameters may be stored in advance in, for example, the HDD 41 of the computer 11, or may be input to the computer 11 by a user's operation of the keyboard 39 or the mouse 40 or via the external-device interface 36.

In step S14, the computer 11 performs affine transformation on each block blk(h, k) (not excluded from block matching) of the reference image 51 based on the current affine parameters $P_{cur}$ to calculate a transformation motion vector $V_{GM}$ representing a vector from the block blk(h, k) before the transformation to the block blk'(h, k) after the transformation. The process then proceeds to step S15.

In step S15, the computer 11, for each block blk(h, k) of the reference image 51 for which a matching motion vector $V_{BM}$ has been calculated in step S12, calculates a difference vector $V_D=V_{BM}-V_{GM}$ between the matching motion vector $V_{BM}$ and the transformation motion vector $V_{GM}$ obtained by affine transformation based on the current affine parameters $P_{cur}$ in step S14. The process then proceeds to step S16.

In step S16, the computer 11 executes a process for removing a region of a moving object based on the distribution of the end points of the difference vectors $V_D$ calculated in step S15. The process then proceeds to step S17. In the process for removing a region of a moving object in step S16, blocks blk(h, k) including a moving object are extracted by the first or second extracting method described earlier, and are excluded from processing in subsequent step S17. The process for removing a region of a moving object by the first extracting method will be described later with reference to FIG. 13, and the process for removing a region of a moving object by the second extracting method will be described with reference to FIG. 15.

In step S17, the computer 11 calculates new affine parameters $P_{new}$ that minimize the sum of squares of the magnitudes $|V_D|$ of the difference vectors $V_D$ for all the remaining blocks blk(h, k) after removing the blocks blk(h, k) including a moving object from the blocks blk(h, k) of the reference image 51 for which difference vectors $V_D$ have been calculated (i.e., all the blocks blk(h, k) remaining after the processing in step S16), i.e., new affine parameters $P_{new}$ that minimize the sum E of square errors in expression (5). The process then proceeds to step S18.

In step S18, the computer 11 determines whether the new affine parameters $P_{new}$ have reached convergence, i.e., whether the affine parameters $P_{new}$ calculated in step S17 are substantially equal to the current affine parameters $P_{cur}$, for example, based on whether expression (7) or expression (8) is satisfied.

When it is determined in step S18 that the new affine parameters $P_{new}$ are not considered to be substantially equal to the current affine parameters $P_{cur}$, the process proceeds to step S19. In step S19, the computer 11 assigns the new affine parameters $P_{new}$ to the current affine parameters $P_{cur}$ to update the current affine parameters $P_{cur}$. The process then returns to step S14. Then, the processing in steps S14 to S19 is repeated until it is determined in step S18 that the new affine parameters $P_{new}$ can be considered to be substantially equal to the current affine parameters $P_{cur}$.

In step S16 during the iterations of steps S14 to S19, the process for removing a region of a moving object from the blocks blk(h, k) for which difference vectors $V_D$ have been calculated is executed. Alternatively, in step S16, a process for removing a region of a moving object from blocks blk(h, k) not including the blocks blk(h, k) removed in step S16 may be executed.

When it is determined in step S18 that the new affine parameters $P_{new}$ can be considered to be substantially equal to the current affine parameters $P_{cur}$, the new affine parameters $P_{new}$ (or the current affine parameters $P_{cur}$) are output, for example, to the digital camera 12 as accurate affine parameters (a, b, c, d, s, t) representing positional relationship between the reference image 51 and the target image 52 so as to allow correction of the effect of camera shake. The positional-relationship calculating process is then exited.

In this example, the affine parameters (a, b, c, d, s, t) output to the digital camera 12 are affine parameters for adjusting the position of the reference image 51 with respect to the target image 52. Thus, in order to adjust position of the target image 52 with reference to the reference image 51, affine parameters for performing inverse transformation of the affine transformation based on the affine parameters (a, b, c, d, s, t) output to the digital camera 12 are to be obtained. The affine parameters for performing inverse transformation may be calculated by the computer 11 or by the digital camera 12.

As described above, in the positional-relationship calculating process, the reference image 51 is divided into a plurality of blocks blk, and a matching motion vector $V_{BM}$ and a transformation motion vector $V_{GM}$ are calculated for each of the blocks blk. The matching motion vector $V_{BM}$ is a motion vector representing the movement from each block blk(h, k) of the reference image 51 to a corresponding region of the target image 52. The transformation motion vector $V_{GM}$ is a motion vector representing the movement from the block blk(h, k) before transformation to the block blk'(h, k) after transformation when the block blk(h, k) is transformed by affine transformation based on the affine parameters $P_{cur}$ representing positional relationship between the reference image 51 and the target image 52.

Furthermore, in the positional-relationship calculating process, the difference vector $V_D(=V_{BM}-V_{GM})$ between the matching motion vector $V_{BM}$ and the transformation motion vector $V_{GM}$ is calculated. Then, based on the distribution of the end points of the difference vectors $V_D$, i.e., based on the fact that the difference vectors $V_D$ of blocks blk(h, k) not including a moving object are concentrated in the proximity of the origin if the current affine parameters $P_{cur}$ are adequately accurate, blocks blk(h, k) including a moving object are extracted and removed, and affine parameters (a, b, c, d, s, t) are calculated using the remaining blocks blk(h, k).

Thus, it is possible to accurately extract blocks blk(h, k) including a moving object (or blocks blk(h, k) not including a moving object), and to calculate affine parameters (a, b, c, d, s, t) accurately representing the positional relationship between the reference image 51 and the target image 52, i.e., not affected by the movement of an object, using only the blocks blk(h, k) not including a moving object.

Figure 7:
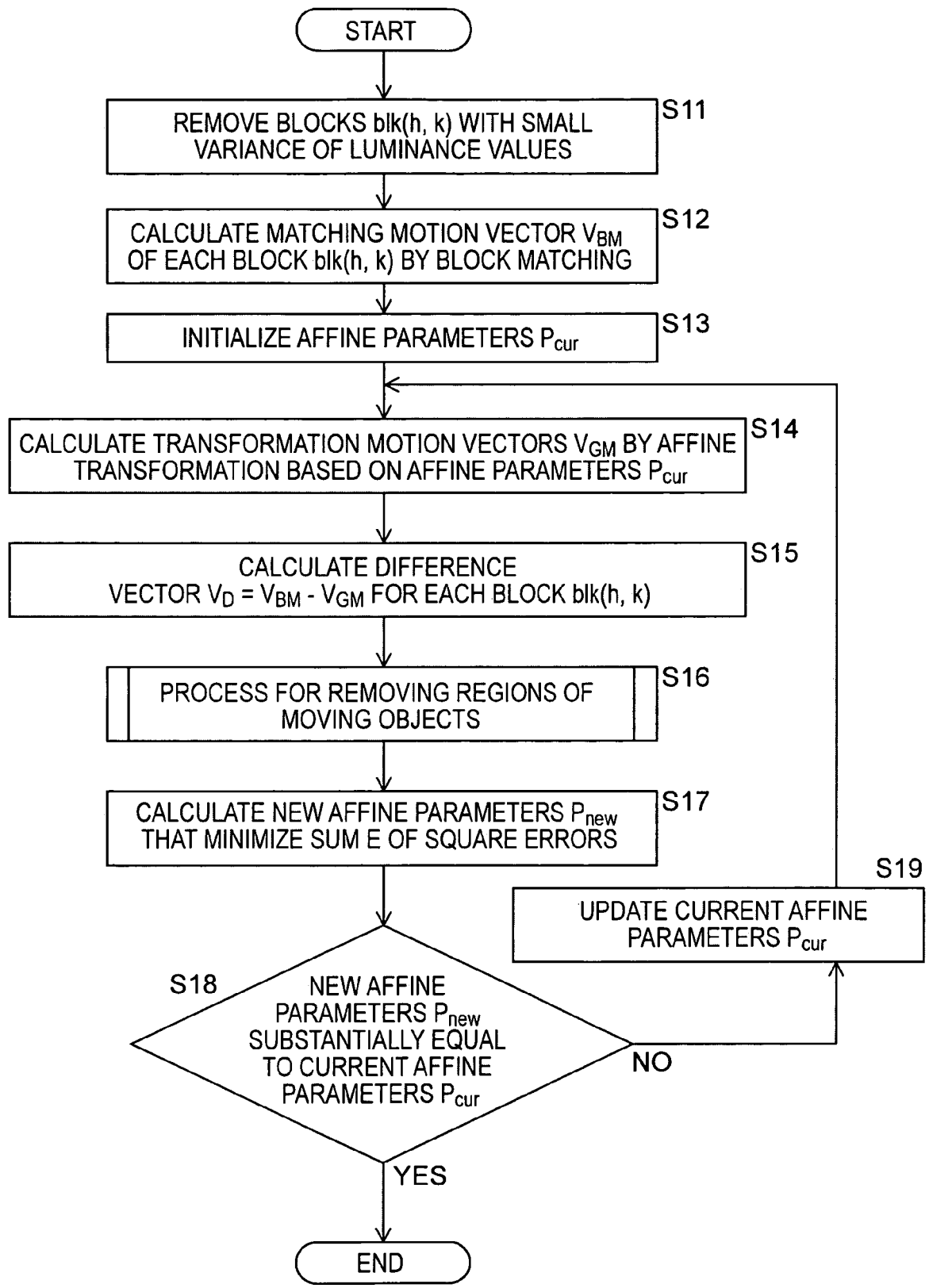
FIG. 7 is a flowchart of a positional-relationship calculating process.

In the positional-relationship calculating process shown in FIG. 7, the processing in steps S14 to S19 is repeated until it is determined in step S18 that the new affine parameters $P_{new}$ have reached convergence. However, the processing in steps S14 to S19 may be repeated until another condition is satisfied, for example, until the processing in steps S14 to S19 is repeated a predetermined number of times (for example, three times).

In the first extracting method described above, when blocks blk(h, k) including a moving object or blocks blk(h, k) not including a moving object are extracted, as described with reference to FIG. 5, using a border defined by the circumference of the circle 81 having the center Q at the origin of the XY coordinate system on which the end points of the difference vectors $V_D$ are plotted, blocks blk(h, k) associated with difference vectors $V_D$ whose end points are plotted inside the circle 81 are extracted as blocks not including a moving object, or blocks blk(h, k) associated with difference vectors $V_D$ whose end points are plotted outside the circle 81 are extracted as blocks including a moving object.

However, as described earlier, when the initial values ($a_0$, $b_0$, $c_0$, $d_0$, $s_0$, $t_0$) of affine parameters, initially set to the current affine parameters $P_{cur}$, are not adequately accurate, i.e., when the initial values ($a_0$, $b_0$, $c_0$, $d_0$, $s_0$, $t_0$) are far from the true affine parameters (a, b, c, d, s, t), if the transformation motion vector $V_{GM}$ and the difference vector $V_D$ of the block blk(h, k) are calculated using the initial values ($a_0$, $b_0$, $c_0$, $d_0$, $s_0$, $t_0$) of affine parameters, the distribution of the end points of the difference vectors $V_D$(h, k) of blocks blk(h, k) not including a moving object is not concentrated in the proximity of the origin.

Figure 8:
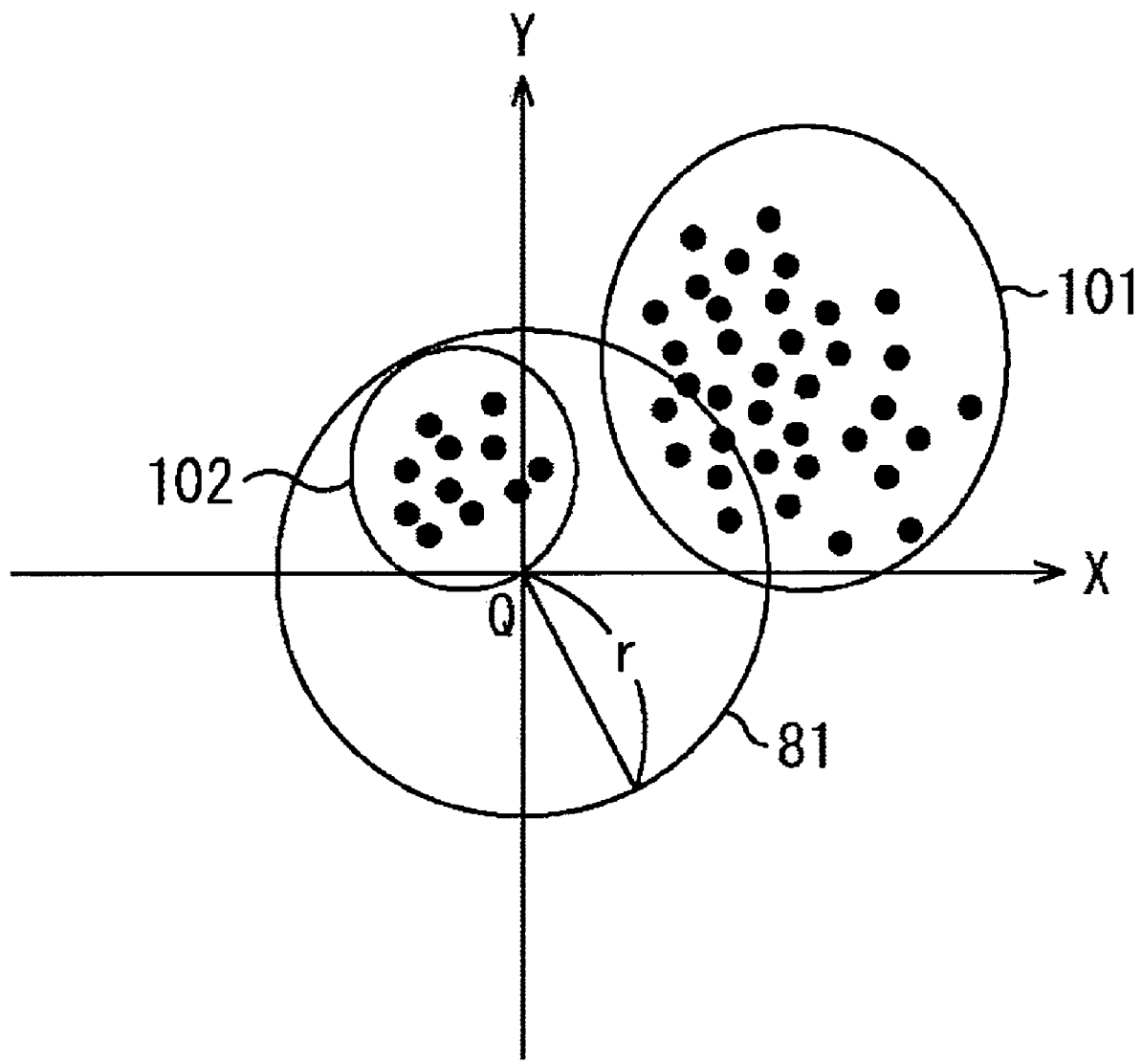
FIG. 8 is a diagram for explaining distribution of end points of difference vectors.

FIG. 8 shows the distribution of the end points of the difference vectors $V_D$(h, k) in a case where the end points of the difference vectors $V_D$ of blocks blk(h, k) not including a moving object are not concentrated in the proximity of the origin since the current affine parameters $P_{cur}$ are far from the true affine parameters (a, b, c, d, s, t).

In FIG. 8, the end points of the difference vectors $V_D$(h, k) of blocks blk(h, k) not including a moving object are distributed in a region 101 that is relatively remote from the origin, and the end points of the difference vectors $V_D$(h, k) of blocks blk(h, k) including a moving object are distributed in a region 102 that is relatively close to the origin.

Thus, in FIG. 8, some of the end points of the difference vectors $V_D$ of the blocks blk(h, k) not including a moving object in the region 101, and all the end points of the difference vectors $V_D$ of the blocks blk(h, k) including a moving object in the region 102 are included inside the circle 81 having the center Q at the origin.

Thus, when blocks blk(h, k) associated with difference vectors $V_D$ whose end points are located inside the circle 81 are extracted as blocks not including a moving object, blocks blk(h, k) including a moving object could be extracted erroneously as blocks not including a moving object.

Thus, in order to overcome this problem, in the process for removing a region of a moving object, instead of setting the center Q at the origin, the center Q of the circle 81 for extracting blocks blk(h, k) including a moving object or blocks blk(h, k) not including a moving object can be set based on the distribution of the end points of the difference vectors $V_D$ of the blocks blk(h, k) plotted on the XY coordinate system.

Now, a process for setting the center Q of the circle 81 for extracting blocks blk(h, k) including a moving object or blocks blk(h, k) not including a moving object based on the distribution of the end points of the difference vectors $V_D$ of the blocks blk(h, k) plotted as two-dimensional XY coordinates on the XY coordinate system (hereinafter referred to as a process for setting the center of an extraction circle) will be described with reference to FIGS. 9 to 12.

In the process for setting the center of an extraction circle, it is assumed that the coordinates of the center (barycenter) of the set of the end points of the difference vectors $V_D$ of the blocks blk(h, k) not including a moving object coincide with the coordinates at which the number of the end points of the difference vectors $V_D$ per unit area on the XY coordinate system, i.e., at which the density of distribution of the end points of the difference vectors $V_D$ is maximum.

Generally, a region of a non-moving object (a region that is not a region of a moving object) in images is usually sufficiently larger than a region of a moving object, so that the above assumption reasonably holds.

In the process for setting the center of an extraction circle, based on the above assumption, coordinates $V_g$ that maximize the density of distribution of difference vectors $V_D$ of blocks blk(h, k) (not excluded from block matching) of the reference image 51 are calculated as the center Q of the circle 81.

The coordinates $V_g$ that maximize the density of distribution of the end points of the difference vectors $V_D$ can be simply calculated, for example, as follows.

Figure 9:
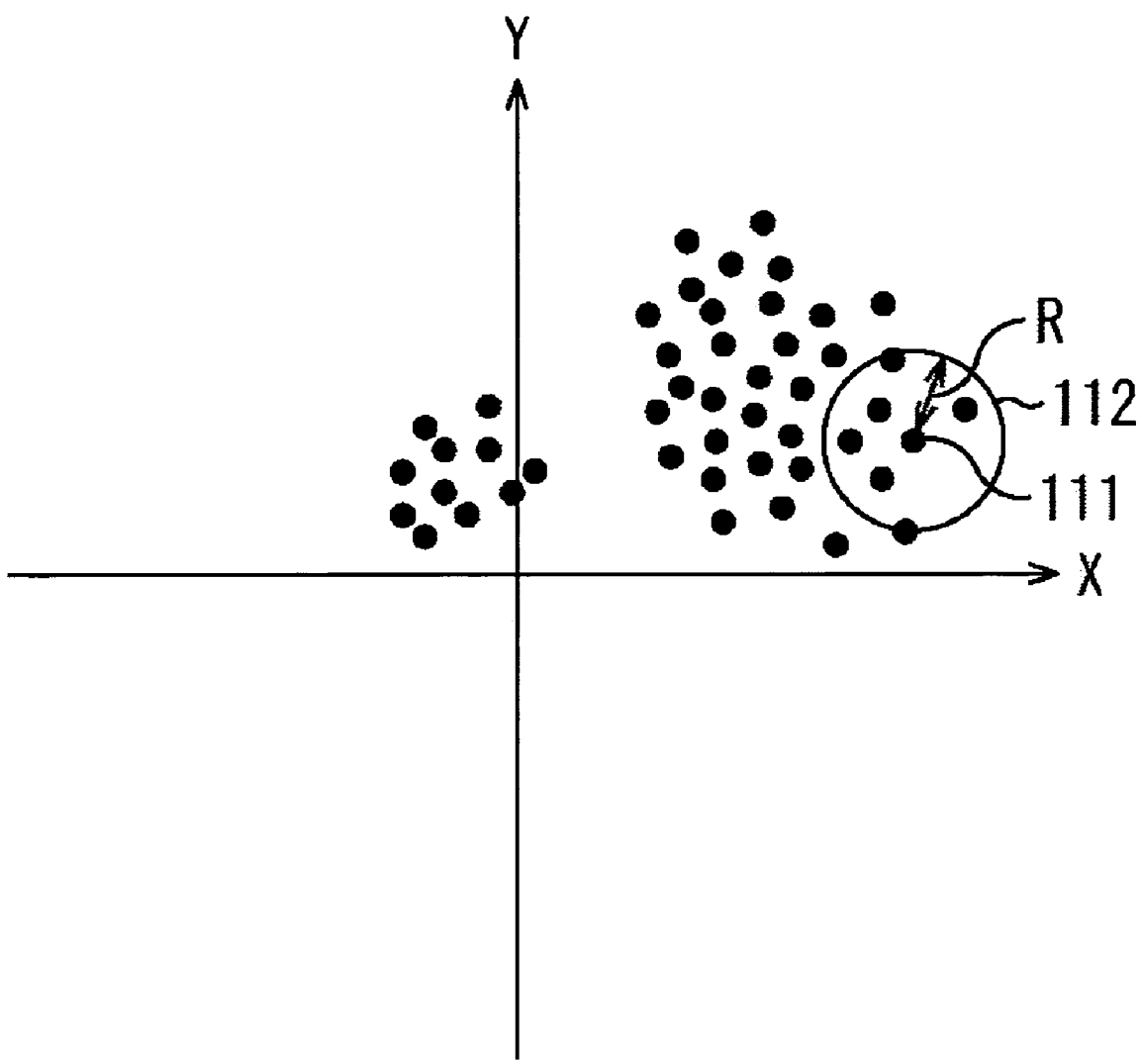
FIG. 9 is a diagram for explaining a process for setting a center of an extraction circle in the second extracting method.

As shown in FIG. 9, the computer 11 selects the end point 111 of a difference vector $V_D$ as a subject point, and counts the number of difference vectors $V_D$ whose end points are located inside a circle 112 centered at the subject point 111 and having a radius R. In the example shown in FIG. 9, the end points of six difference vectors $V_D$ are located inside the circle 112 centered at the subject point 111 and having the radius R, including the subject point 111, so that regarding the subject point 111, the number of difference vectors $V_D$ whose end points are located inside the circle 112 centered at the subject point 111 and having the radius R is 6.

The computer 11 sequentially selects each of the end points of all the difference vectors $V_D$ plotted on the XY coordinate system as a subject point, and counts the number of difference vectors $V_D$ described above. The computer 11 determines the end point of a difference vector $V_D$ that maximizes the counted number as coordinates $V_g$ that maximize the density of distribution of end points.

According to this method, however, the number of the difference vectors $V_D$ is counted for all the end points of the difference vectors $V_D$ plotted on the XY coordinate system, so that the amount of computation is huge. Thus, this method is not suitable, for example, in applications that are supposed to operate in real time or in environments where the capability of computation is not sufficient.

Thus, the computer 11 executes the process for setting the center of an extraction circle (calculates coordinates $V_g$ that maximize the density of distribution of end points) by a reduced amount of computation, for example, as follows.

Figure 10:
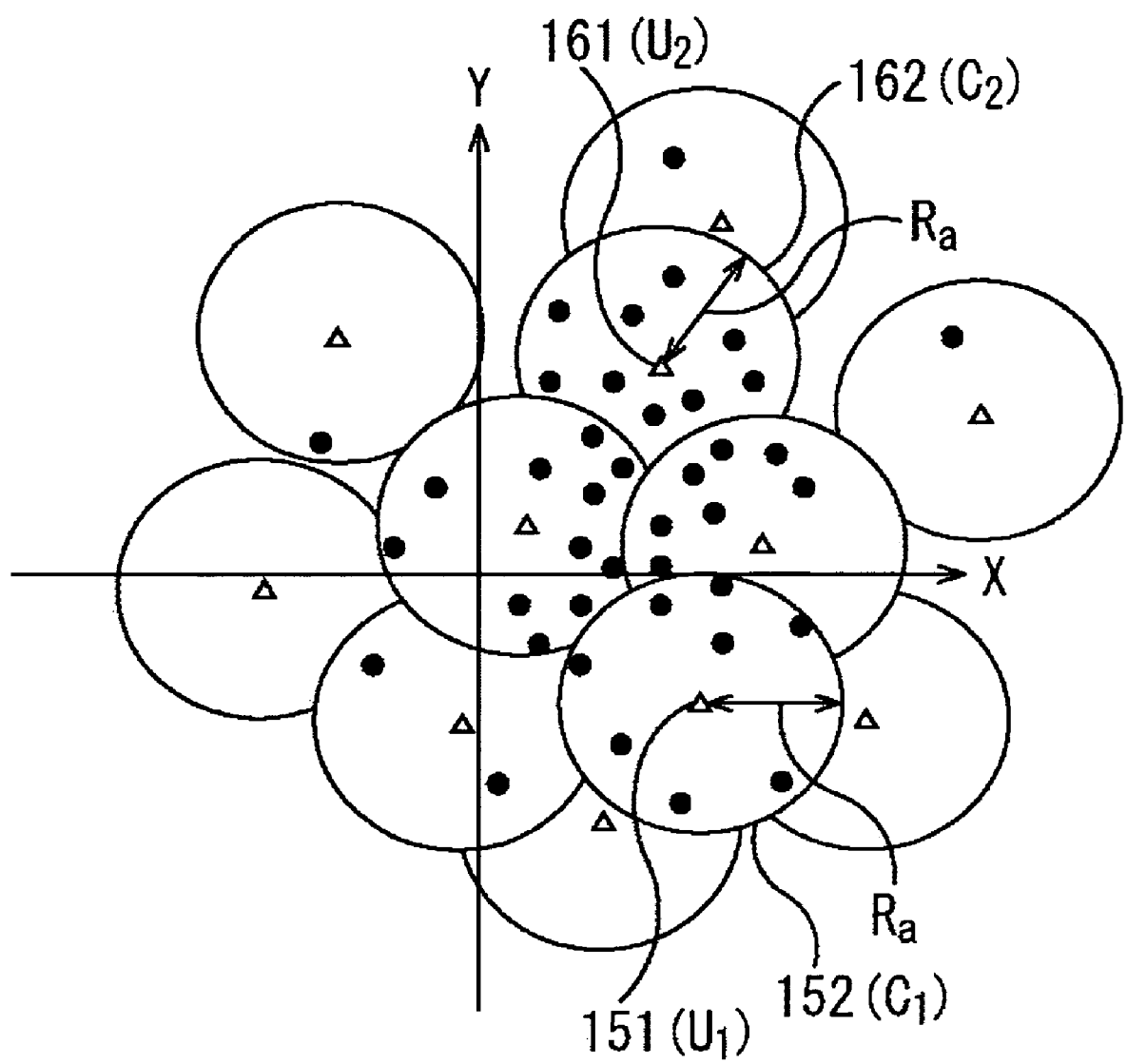
FIG. 10 is a diagram for explaining a process for setting a center of an extraction circle in the second extracting method.

As shown in FIG. 10, the computer 11 selects the end point 151 of a difference vector $V_D$ as a subject point, and selects difference vectors $V_D$ whose end points are located inside a circle 152 centered at the subject point 151 and having a radius $R_a$ as difference vectors $V_D$ belonging to the circle 152.

Then, the computer 11 selects, as a new subject point, a point 161 of a difference vector $V_D$ from the end points of the difference vectors $V_D$ other than the difference vectors $V_D$ belonging to the circle 152 centered at the subject point 151 and having the radius $R_a$, and determines difference vectors $V_D$ whose end points are located inside a circle 162 centered at the subject point 161 and having the radius $R_a$ as difference vectors $V_D$ belonging to the circle 162.

The computer 11 executes the same process until each of the end points of all the difference vectors $V_D$ plotted on the XY coordinate system belongs to a circle, as shown in FIG. 10.

In FIG. 10, of the end points of the difference vectors $V_D$ plotted on the XY coordinate system, a point selected as a subject point and located at the center of a circle is represented by a triangle for distinction from end points belonging to the circle (represented by black dots).

In the following description, an end point of a difference vector $V_D$ selected as a subject point and located at the center of a circle will be referred to as a selected point $U_j$. A region inside the circle centered at the selected point $U_j$ and having the radius $R_a$ will be referred to as a region $C_j$. A region that has already been a region $C_k$ of another selected point $U_k$ (j ≠ k) is not included in the region $C_j$. Thus, the end point of a difference vector $V_D$ belongs to the region $C_j$ of only one selected point $U_j$.

j and k are indices for identifying selected point on the XY coordinate system. For example, in FIG. 10, 11 selected points exist, so that j, k=1, 2, . . . , 11 (j≠k).

For example, the computer 11 selects each of the blocks blk(h, k) of the reference image 51 as a subject block from top left to bottom right, i.e., in the order of raster scanning, and determines whether the end point of the difference vector $V_D$ of the subject block blk(h, k) already belongs to a circle centered at a selected point $U_j$. When it is determined that the end point of the difference vector $V_D$ of the subject block blk(h, k) belongs to a circle centered at a selected point $U_j$, the computer 11 selects a next block blk(h, k) as a subject block in the order of raster scanning. On the other hand, when it is determined that the end point of the difference vector $V_D$ of the subject block blk(h, k) does not belong to any circle centered at a selected point $U_j$, the computer 11 selects the end point of the difference vector $V_D$ of the subject block blk(h, k) as a selected point (new subject point) $U_j$, and determines the end points of the difference vectors $V_D$ located in the region $C_j$ centered at the selected point $U_j$ and having the radius $R_a$ and not belonging to the region $C_k$ of another selected point $U_k$ as the end points of the difference vectors $V_D$ belonging to the region $C_j$ of the selected point $U_j$. Then, the computer 11 selects a next block blk(h, k) as a subject block in the order of raster scanning, and repeats the same process until all the blocks blk(h, k) of the reference image 51 are selected as subject blocks.

Figure 11:
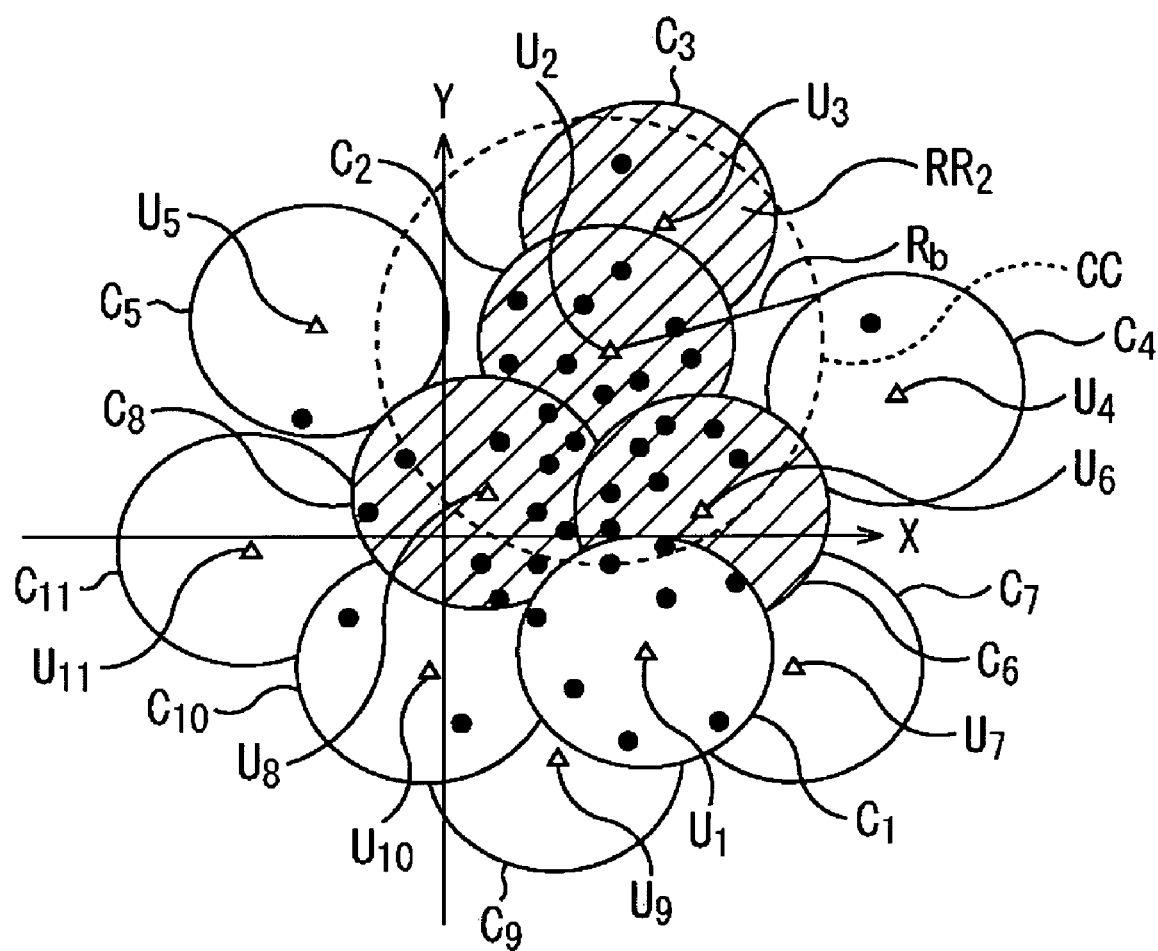
FIG. 11 is a diagram for explaining a process for setting a center of an extraction circle in the second extracting method.

As described above, the end point of each difference vector $V_D$ plotted on the XY coordinate system is caused to belong to a region $C_j$ of a selected point $U_j$, as shown in FIG. 11. Then, the computer 11 selects, as a subject point, a selected point $U_j$ from the selected points $U_j$ plotted on the XY coordinate system, and detects all the selected point $U_k$, except for the subject point $U_j$, located inside a circle CC centered at the subject point $U_j$ and having a radius Rb. In FIG. 11, a selected point $U_2$ is selected as a subject point, and a circle CC centered at the subject point $U_2$ and having the radius $R_b$ is represented by a dotted line. Furthermore, in FIG. 11, selected points $U_3$, $U_6$, and $U_8$ are detected as other selected points $U_k$ located inside the circle CC centered at the subject point $U_2$ and having the radius $R_b$.

Then, the computer 11 counts the number $PN_j$ of the end points of the difference vectors $V_D$ located in a region $RR_j$ including the region $C_j$ of the subject point $U_j$ and the regions $C_k$ of the other selected points $U_k$ detected inside the circle centered at the subject point $U_j$ and having the radius $R_b$. In FIG. 11, the number $PN_2$ of the end points (plotted by black dots and triangles) of the difference vectors $V_D$ located inside the hatched region $RR_2$ including the region $C_2$ of the subject point $U_2$ and the regions $C_3$, $C_6$, and $C_8$ of the other selected points $U_3$, $U_6$, and $U_8$ detected inside the circle CC centered at the subject point $U_2$ and having the radius $R_b$ is counted.

The computer 11 counts the number $PN_j$ of the end points of the difference vectors $V_D$ located inside the region $RR_j$ of the selected point $U_j$ for every selected point on the XY coordinate system, and selects the selected point $U_j$ that maximizes the number $PN_j$.

Then, the computer 11 determines the barycenter coordinates $V_g$ of the end points of the difference vectors $V_D$ located in the region $RR_j$ of the selected point $U_j$ that maximizes the number $PN_j$, as the center Q of the circle 81 used to extract blocks blk(h, k) including a moving object or blocks blk(h, k) not including a moving object. Thus, a region where the density of distribution of end points is high is selected, and blocks blk(h, k) associated with the difference vectors $V_D$ whose end points are distributed in the region can be extracted as blocks not including a moving object.

Figure 12:
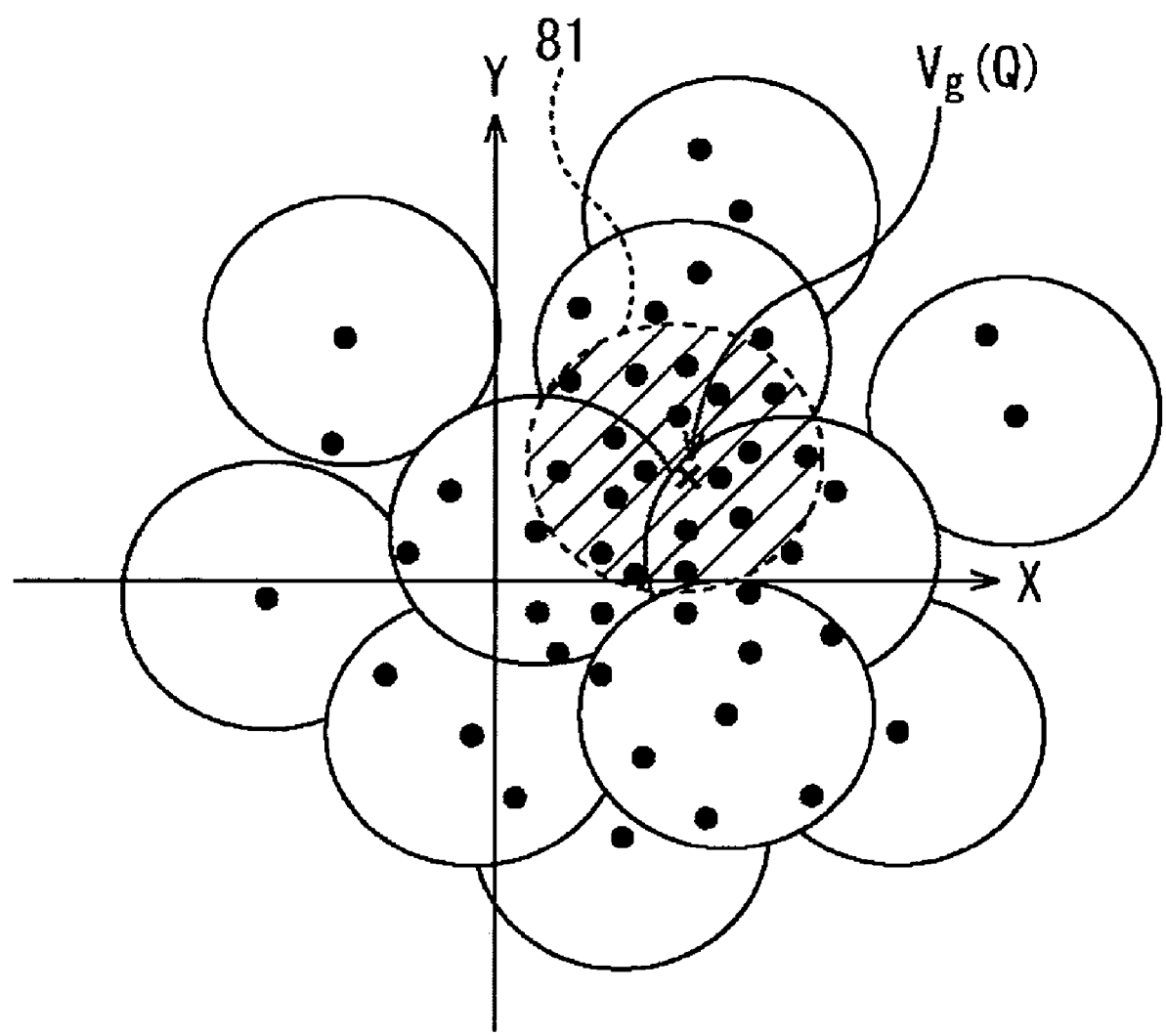
FIG. 12 is a diagram for explaining a process for setting a center of an extraction circle in the second extracting method.

In the example shown in FIG. 11, when the number $PN_2$ of the end points of the difference vectors $V_D$ located in the region $RR_2$ of the selected point $U_2$ is maximum among all the selected points $U_j$, the barycenter coordinates $V_g$ of the end points of the difference vectors $V_D$ located in the region $RR_2$ of the selected point $U_2$, indicated by crosses in FIG. 12, are calculated as the center Q of the circle 81.

Next, the process for removing a region of a moving object by the first extracting method in step S16 shown in FIG. 7 will be described with reference to a flowchart shown in FIG. 13.

First, in step S41, (the CPU 31 of) the computer 11 determines whether the process for removing a region of a moving object in the positional-relationship calculating process shown in FIG. 7 is the first iteration. When the process for removing a region of a moving object in the positional-relationship calculating process shown in FIG. 7 is the first iteration, the initial values of affine parameters, which could be considerably different from true affine parameters, are set to the current affine parameters $P_{cur}$.

Thus, when it is determined in step S41 that the process for removing a region of a moving object is the first iteration, the process proceeds to step S42. In step S42, the computer 11 executes the process for setting the center of an extraction circle described earlier, i.e., calculates the barycenter coordinates $V_g$ that maximize the density of distribution of the end points of difference vectors $V_D$ as the center Q of the circle 81 for extracting blocks blk(h, k) including a moving object or blocks blk(h, k) not including a moving object. The process then proceeds to step S44.

On the other hand, when it is determined in step S41 that the process for removing a region of a moving object is not the first iteration, the process proceeds to step S43. In step S43, the computer 11 sets the center Q of the circle 81 for extracting blocks blk(h, k) including a moving object or blocks blk(h, k) not including a moving object to the origin of the XY coordinate system on which the end points of the difference vectors $V_D$ are plotted. The process then proceeds to step S44.

In the second and subsequent iterations of the process for removing a region of a moving object, the affine parameters $P_{cur}$ have been updated at least once in step S19 shown in FIG. 7. When the affine parameters $P_{cur}$ have been updated at least once, the current affine parameters $P_{cur}$ are accurate to a certain extent. Thus, the transformation motion vectors $V_{GM}$ of blocks blk(h, k) not including a moving object, calculated by affine transformation based on the affine parameters $P_{cur}$, are approximate to the matching motion vectors $V_{BM}$. Thus, the difference vectors $V_D (=V_{BM}-V_{GM})$ are close to 0, and the end points thereof are concentrated in the proximity of the origin. Thus, in the second and subsequent iterations of the process for removing a region of a moving object, instead of calculating the barycenter coordinates $V_g$ that maximize the density of distribution of the end points of difference vectors $V_D$, in step S43, the origin is set to the center Q of the circle 81 where the end points of difference vectors $V_D$ are concentrated. However, the barycenter coordinates $V_g$ that maximize the density of distribution of the end points of difference vectors $V_D$ may be used as the center Q of the circle 81 even in the second and subsequent iterations of the process for removing a region of a moving object.

In step S44, as described with reference to FIG. 5 or FIG. 12, the computer 11, using a border defined by the circle 81 having the radius r and the center Q located at the origin or the barycenter coordinates $V_g$ that maximize the density of distribution of the end points of difference vectors $V_D$, i.e., using the circle 81 in which the density of distribution of the end points of difference vectors $V_D$ is high, extracts blocks blk(h, k) associated with the difference vectors $V_D$ whose end points are located inside the circle 81 as blocks blk(h, k) not including a moving object, or extracts blocks blk(h, k) associated with the difference vectors $V_D$ whose end points are located outside the circle 81 as blocks blk(h, k) including a moving object, removing the blocks blk(h, k) including a moving object from the processing for calculating the new affine parameters $P_{new}$ in step S17 in FIG. 7. The process then returns.

In step S44, blocks blk(h, k) associated with the difference vectors $V_D$ for which the distance $|V_D-Q|$ between the end point of the difference vector $V_D$ and the center Q of the circle 81 is greater than the threshold (radius) r are extracted as blocks including a moving object, or blocks blk(h, k) associated with the difference vectors $V_D$ for which the distance $|V_D-Q|$ is not greater than the threshold r are extracted as blocks not including a moving object. Thus, the radius r of the circle 81 having the center Q can be considered as a threshold for extracting blocks blk(h, k) including a moving object or blocks blk(h, k) not including a moving object.

Figure 13:
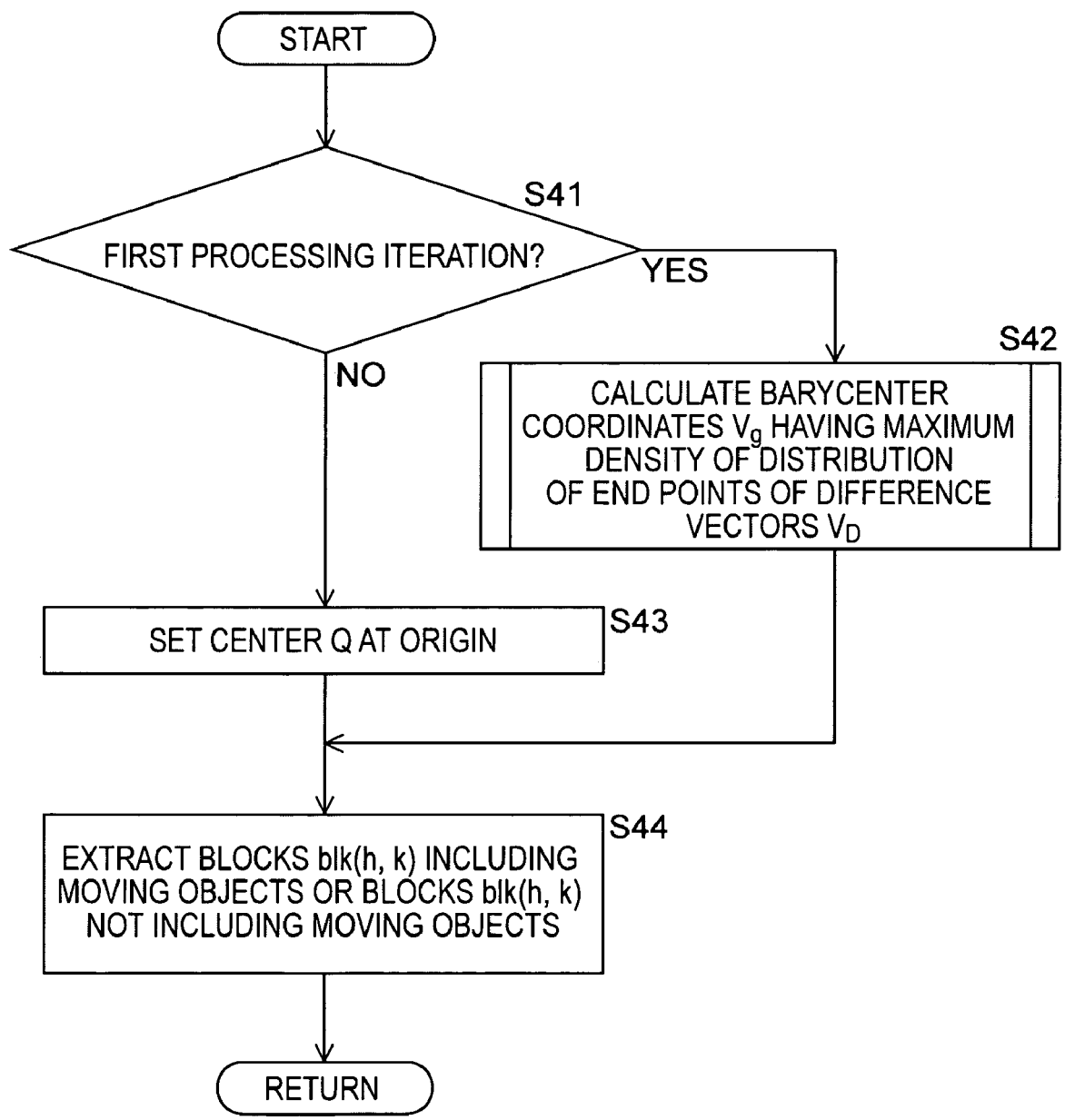
FIG. 13 is a flowchart for explaining a process for removing a region of a moving object.

As described above, in the process for removing a region of a moving object shown in FIG. 13, based on the density of distribution of the end points of difference vectors $V_D$, i.e., based on the fact that the distribution of the end points of the difference vectors $V_D$ of blocks blk(h, k) not including a moving object is concentrated in a specific region, blocks blk(h, k) including a moving object or blocks blk(h, k) including a non-moving object are extracted.

When the radius r of the circle 81 having the center Q is a specific constant, depending on the effect of noise included in an image, blocks blk(h, k) not including a moving object could be removed as blocks blk(h, k) including a moving object. Thus, when the number of the end points of difference vectors $V_D$ included inside the circle 81 having the radius r is small (not greater than a predetermined threshold), the value of the radius r is modified to a somewhat larger value, and the number of the end points of difference vectors $V_D$ included inside the circle 81 having the modified radius r is counted. This operation can be repeated until the number becomes greater than or equal to the predetermined threshold. By allowing the radius r of the circle 81 to be changed as described above, a moving object or a non-moving object can be extracted more accurately.

In the process for removing a region of a moving object, shown in FIG. 13, it is determined in step S41 whether the process for removing a region of a moving object is the first iteration, and the barycenter coordinates $V_g$ that maximize the density of distribution of the end points of the difference vectors $V_D$ are calculated when it is determined that the process is the first iteration. Alternatively, in the first iteration, similarly to the second and subsequent iterations, the center Q of the circle 81 for extracting blocks blk(h, k) including a moving object or blocks blk(h, k) not including a moving object may be set at the origin of the XY coordinate system where the end points of the difference vectors $V_D$ are plotted. In this case, steps S41 and S42 in FIG. 13 can be omitted, and steps S43 and S44 suffice.

Figure 14:
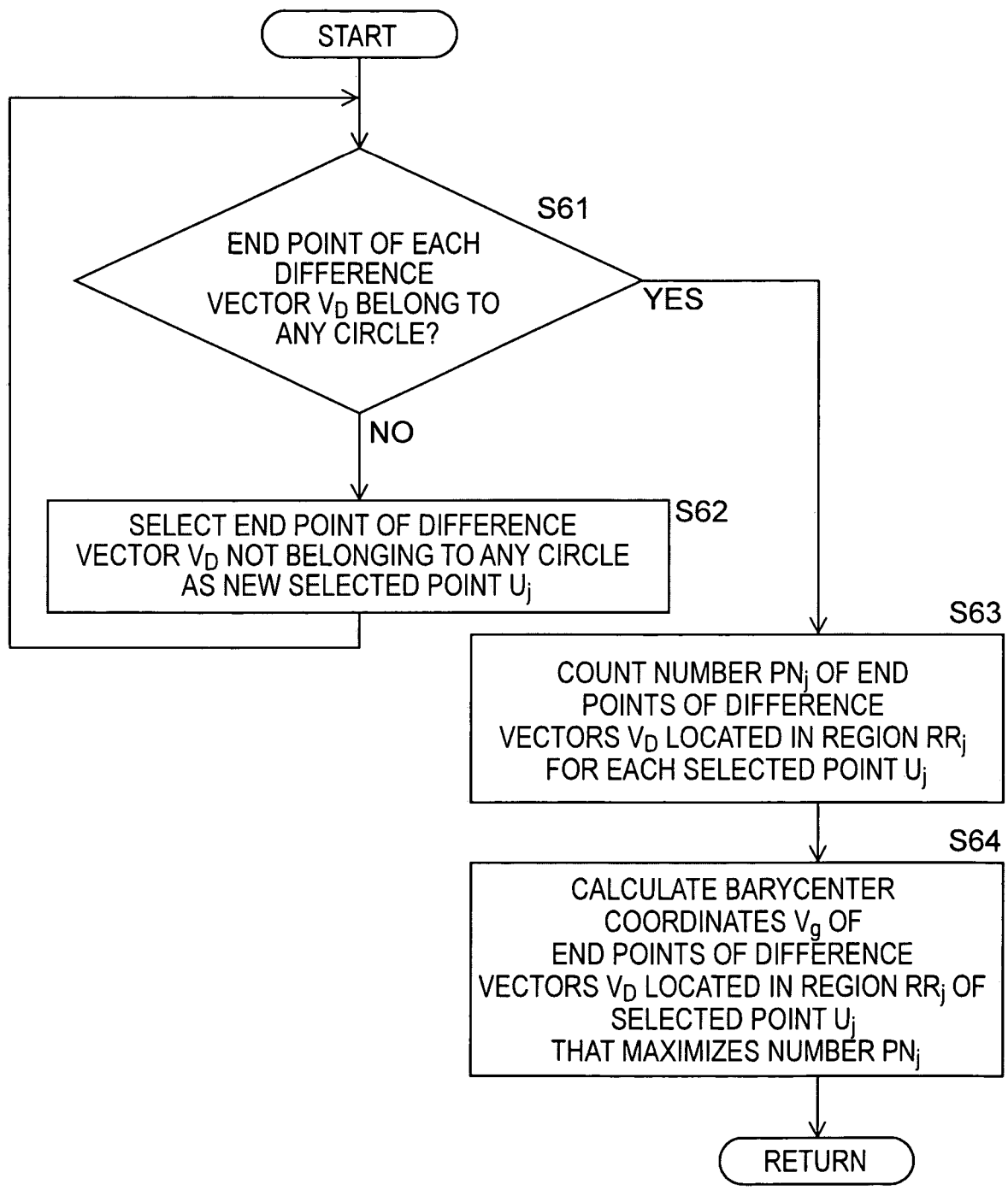
FIG. 14 is a flowchart of a process for setting a center of an extraction circle.

Next, the process for setting the center of an extraction circle in step S42 in FIG. 13, i.e., the process for calculating the barycenter coordinates $V_g$ that maximize the density of distribution of the end points of the difference vectors $V_D$ as the center Q of the circle 81 for extracting blocks blk(h, k) including a moving object or blocks blk(h, k) not including a moving object, will be described with reference to a flowchart shown in FIG. 14.

First, in step S61, the computer 11 determines whether the end point of every difference vector $V_D$ plotted on the XY coordinate system belongs to a circle having the radius $R_a$ and centered at a selected point $U_j$ (circle defining the region $C_j$ shown in FIG. 11).

When it is determined in step S61 that the end point of a difference vector $V_D$ that does not belong to any circle centered at a selected point $U_j$ still exists, the process proceeds to step S62. In step S62, the computer 11 selects the end point of a difference vector $V_D$ not belonging to any circle as a new selected point $U_j$, and recognizes the end points of the difference vectors $V_D$ located inside the circle centered at the selected point $U_j$ and having the radius $R_a$ as end points belonging to the circle centered at the selected point $U_j$ and recognizes a region that is inside the circle and that is not a part of another region $C_j$ as the region $C_j$ described with reference to FIG. 11. The process then returns to step S61.

On the other hand, when it is determined in step S61 that the end point of every difference vector $V_D$ plotted on the XY coordinate system belongs to a circle centered at a selected point $U_j$ and having the radius $R_a$, the process proceeds to step S63. In step S63, for each selected point $U_j$ on the XY coordinate system, the computer 11 counts the number $PN_j$ of the end points of difference vectors $V_D$ located in the region $RR_j$ described with reference to FIG. 11, including the region $C_j$ of the selected point $U_j$ and the regions $C_k$ of all the other selected points $U_k$ located inside the circle CC centered at the selected point $U_j$ and having the radius $R_b$. The process then proceeds to step S64.

In step S64, the computer 11 calculates the barycenter coordinates $V_g$ of the end points of difference vectors $V_D$ located in the region $RR_j$ of the selected point $U_j$ that maximizes the number $PN_j$. The process then returns.

Figure 15:
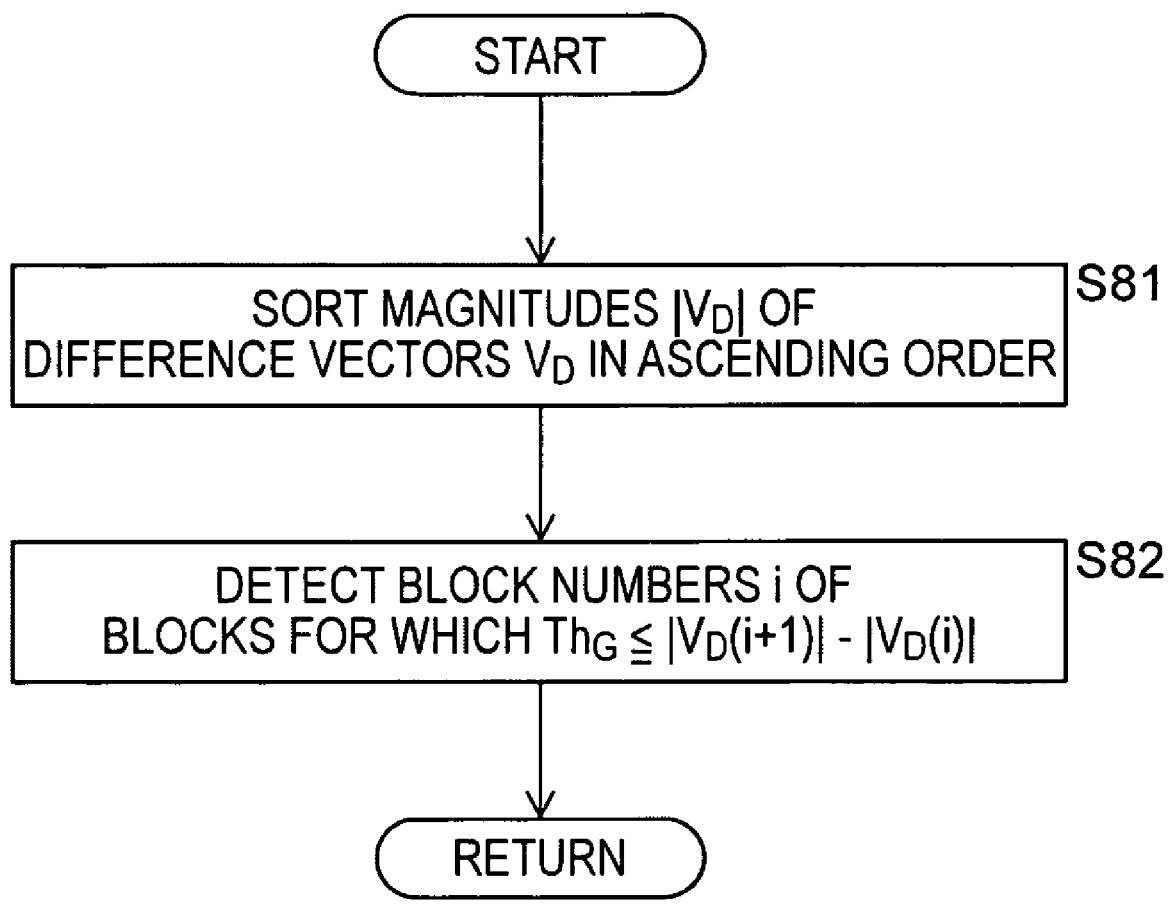
FIG. 15 is a flowchart of a process for removing a region of a moving object.

Next, the process for removing a region of a moving object by the second extracting method in step S16 shown in FIG. 7 will be described with reference to a flowchart shown in FIG. 15.

First, in step S81, the computer 11 calculates the magnitudes $|V_D|$ of the difference vectors $V_D$ of blocks blk(h, k) of the reference image 51, and sorts the magnitudes $|V_D|$ of the difference vectors $V_D$ in ascending order. The process then proceeds to step S82.

In step S82, the computer 11 determines whether the magnitudes $|V_D(1)|, |V_D(2)|, \ldots, |V_D(N)|$ sorted in ascending order in step S81 satisfy expression (4) in ascending order of block number i, thereby detecting block numbers i of blocks for which the magnitude of the difference between $|V_D(i+1)|$ and $|V_D(i)|$ is greater than or equal to the predetermined threshold $Th_G$.

When a plurality of block numbers i with which expression (4) is satisfied exists, for example, a block number i that is detected first or last, or a block number i with which the difference between $|V_D(i+1)|$ and $|V_D(i)|$ is maximized is selected.

In step S82, after detecting the block number i that satisfies expression (4), the computer 11 extracts blocks $blk_1$ to $blk_i$ with block numbers not greater than i as blocks not including a moving object, or extracts blocks $blk_{i+1}$ to $blk_N$ with block numbers not less than i+1 as blocks including a moving object, excluding the blocks $blk_{i+1}$ to $blk_N$ including a moving object from calculation of the new affine parameters $P_{new}$ in step S17 shown in FIG. 7. The process then returns.

As described above, in the positional-relationship calculating process, blocks including a moving object or blocks not including a moving object are extracted by the first or second extracting method, excluding blocks including a moving object from calculation of affine parameters (a, b, c, d, s, t). Thus, affine parameters (a, b, c, d, s, t) representing accurate positional relationship, which serves to correct the effect of horizontal movement or rotation caused by camera shake, can be obtained.

According to the method proposed in Japanese Unexamined Patent Application Publication No. 07-038800, as described earlier, an image is divided into four regions, and each of the four regions is further divided into a plurality of blocks. Then, a motion vector V is calculated for each block in each region.

Furthermore, the exitance of each of the four regions is calculated, and two regions with smaller values of exitance among the values of exitance of the four regions are selected. Then, an average motion vector of the two selected regions is calculated as a motion vector of the image as a whole, i.e., as a parameter representing movement of the image as a whole.

However, when a moving object is included in all the four regions, it is not possible to separate the moving objects accurately. That is, it is not possible to calculate affine parameters (a, b, c, d, s, t) accurately representing movement of the image as a whole caused by camera shake.

In contrast, in the positional-relationship calculating process, based on the assumption that generally the barycenter coordinates of the end points of difference vectors $V_D$ of blocks not including a moving object substantially coincide with the coordinates at which the number of end points of difference vectors $V_D$ per unit area is maximum, i.e., the coordinates at which the density of distribution of end points of difference vectors $V_D$ is maximum, blocks associated with the difference vectors $V_D$ whose end points are located in a region where the density of distribution of end points of difference vectors $V_D$ is maximum are extracted as blocks not including a moving object. Thus, for example, blocks including a moving object, i.e., blocks other than the extracted blocks, can be removed, and parameters accurately representing movement of the image as a whole can be calculated.

When the ratio of a moving object Z to an entire image is relatively larger than the ratios of other objects, the number of difference vectors $V_D$ associated with the moving object Z becomes larger, so that the density of distribution of the end points thereof becomes higher. Thus, in the positional-relationship calculating process, motion vectors associated with the moving object Z are calculated as parameters representing movement of the entire image.

Furthermore, for example, when an automobile (moving object) moving at a constant speed is continuously imaged with a camera tracking the automobile, i.e., when the moving automobile is imaged by a follow shot, the moving automobile looks to be still or slowly moving with respect to the image frame. When the ratio of the moving automobile to the entire image is larger compared with the ratios of still objects such as a background, in the positional-relationship calculating process, parameters for adjusting the position of the moving automobile in the continuously captured images can be calculated as parameters representing the movement of the entire image.

Furthermore, although affine parameters (a, b, c, d, s, t) representing positional relationship between the reference image 51 and the target image 52 are calculated in the embodiment described above, when it is known that only rotation and horizontal movement occur between two images (when such approximation is allowed), affine parameters (θ, s, t) for affine transformation represented by expression (9) yielded by assigning a=d=cos θ and −b=c=sin θ in expression (1) can be calculated. Furthermore, it is possible to calculate affine parameters (a, b, c, d, s, t) in which a component is fixed to a predetermined value.

$$\begin{pmatrix} x \\ y \end{pmatrix} = \begin{pmatrix} \cos\theta & \sin\theta \\ \sin\theta & \cos\theta \end{pmatrix} \begin{pmatrix} x' \\ y' \end{pmatrix} + \begin{pmatrix} s \\ t \end{pmatrix} \quad (9)$$

The affine parameters (a, b, c, d, s, t) representing positional relationship between two images, calculated as described above, can be used, for example, in processing for superposing a plurality of images with each other. Thus, for example, it is possible to obtain a clear and bright image that is substantially free of the effect of camera shake, by superposing a plurality of images obtained by high-speed imaging, having a short exposure period and low luminance.

Furthermore, since affine parameters (a, b, c, d, s, t) representing positional relationship between two images represent movement of the digital camera 12 with respect to an object, it is possible to optically correct the effect of camera shake by affine parameters (a, b, c, d, s, t) representing the movement of the digital camera 12 without using mechanical sensors such as an angular-velocity sensor or an acceleration sensor.

Furthermore, when an image is captured by a solid-state imaging device such as the digital camera 12 including a CMOS (complementary metal oxide semiconductor) image sensor, skew distortion could occur in the output image. Since the position of an image is adjusted by affine transformation in the positional-relationship calculating process executed by the computer 11, it is possible to adjust the position of an image including skew distortion.

The process for extracting blocks including a moving object or blocks not including a moving object can be applied to processes other than the positional-relationship calculating process for calculating affine parameters.

The steps in the flowcharts described in this specification are not necessarily be executed in the orders described, and may be executed in parallel or individually.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus that performs image processing on a first image and a second image, the image processing apparatus comprising:
   dividing means for dividing the first image into a plurality of blocks;
   first motion-vector calculating means for calculating first motion vectors representing movements from the blocks of the first image to corresponding regions of the second image;
   second motion-vector calculating means for calculating second motion vectors representing movements of the blocks that occur when the blocks are transformed based on a first positional-relationship parameter representing positional relationship between the first image and the second image;
   difference-vector calculating means for calculating difference vectors representing differences between the first motion vectors and the second motion vectors;
   region calculating means for calculating a region having a maximum distribution density of end points of difference vectors as a region where end points of difference vectors are concentrated, the region where end points of different vectors are concentrated being a region of a circle centered at a specific point and having a specific radius; and
   extracting means for extracting blocks associated with end points located in the region having the maximum distribution density of end points as blocks including a non moving object, or extracting blocks associated with end points located outside the region having the maximum distribution density of end points as blocks including a moving object.

2. The image processing apparatus according to claim 1, further comprising positional-relationship-parameter calculating means for calculating a second positional-relationship parameter representing a positional relationship between the first image and the second image using the blocks including the non-moving object, extracted by the extracting means.

3. The image processing apparatus according to claim 2, further comprising updating means in an updating process, wherein the updating process is repeated until a predetermined condition is satisfied, the updating process comprising:
   the second motion-vector calculating means calculates second motion vectors representing movements of the blocks that occur when the blocks are transformed using the first positional-relationship parameter updated by the updating means;
   the difference-vector calculating means calculates difference vectors representing differences between the first motion vectors and the second motion vectors;
   the extracting means extracts blocks including the non-moving object based on distribution density of end points of the difference vectors;
   the positional-relationship-parameter calculating means calculates the second positional-relationship parameter using the blocks extracted by the extracting means; and
   the updating means updates the first positional-relationship parameter by the second positional-relationship parameter calculated by the positional-relationship-parameter calculating means.

4. The image processing apparatus according to claim 3, wherein the predetermined condition is that a difference between the first and second positional-relationship parameters is not greater than a predetermined threshold.

5. The image processing apparatus according to claim 2, further comprising outputting means for outputting the second positional-relationship parameter calculated by the positional-relationship-parameter calculating means.

6. The image processing apparatus according to claim 1, wherein the region where end points of difference vectors are concentrated is a region of a circle centered at an origin.

7. A computer-implemented image processing method comprising:
   executing, by a processor of a computer system, the steps of:
      dividing a first image into a plurality of blocks;
      calculating first motion vectors representing movements from the blocks of the first image to corresponding regions of a second image;
      calculating second motion vectors representing movements of the blocks that occur when the blocks are transformed based on a first positional-relationship parameter representing positional relationship between the first image and the second image;
      calculating difference vectors representing differences between the first motion vectors and the second motion vectors;
      calculating a region having a maximum distribution density of end points of difference vectors as a region where end points of difference vectors are concentrated, the region where end points of different vectors are concentrated being a region of a circle centered at a specific point and having a specific radius; and
      extracting blocks associated with end points located in the region having the maximum distribution density of end points as blocks including a non moving object, or extracting blocks associated with end points located outside the region having the maximum distribution density of end points as blocks including a moving object.

8. A computer-readable storage medium storing a computer-readable program which, when executed by a processor, performs image processing on a first image and a second image, the program comprising the steps of:
   dividing the first image into a plurality of blocks;
   calculating first motion vectors representing movements from the blocks of the first image to corresponding regions of the second image;
   calculating second motion vectors representing movements of the blocks that occur when the blocks are transformed based on a first positional-relationship parameter representing positional relationship between the first image and the second image;
   calculating difference vectors representing differences between the first motion vectors and the second motion vectors;

calculating a region having a maximum distribution density of end points of difference vectors as a region where end points of difference vectors are concentrated, the region where end points of different vectors are concentrated being a region of a circle centered at a specific point and having a specific radius; and extracting blocks associated with end points located in the region having the maximum distribution density of end points as blocks including a non moving object, or extracting blocks associated with end points located outside the region having the maximum distribution density of end points as blocks including a moving object.

9. An image processing apparatus that performs image processing on a first image and a second image, the image processing apparatus comprising:

a dividing unit dividing the first image into a plurality of blocks;

a first motion-vector calculator calculating first motion vectors representing movements from the blocks of the first image to corresponding regions of the second image;

a second motion-vector calculator calculating second motion vectors representing movements of the blocks that occur when the blocks are transformed based on a first positional-relationship parameter representing positional relationship between the first image and the second image;

a difference-vector calculator calculating difference vectors representing differences between the first motion vectors and the second motion vectors; and a region calculator calculating a region having a maximum distribution density of end points of difference vectors as a region where end points of difference vectors are concentrated, the region being a region of a circle centered at an origin; and an extracting unit extracting blocks associated with end points located in the region having the maximum distribution density of end points as blocks including a non moving object, or extracting blocks associated with end points located outside the region having the maximum distribution density of end points as blocks including a moving object.

* * * * *

UNITED STATES PATENT AND TRADEMARK OFFICE
CERTIFICATE OF CORRECTION

| | |
|---|---|
| PATENT NO. | : 7,634,143 B2 |
| APPLICATION NO. | : 11/122178 |
| DATED | : December 15, 2009 |
| INVENTOR(S) | : Yasushi Saito |

It is certified that error appears in the above-identified patent and that said Letters Patent is hereby corrected as shown below:

Claim 1, col. 25, lines 44-45, "non moving" should read --non-moving--.

Claim 7, col. 26, line 47, "non moving" should read --non-moving--.

Claim 8, col. 27, line 9, "non moving" should read --non-moving--.

Claim 9, col. 28, lines 17-18, "non moving" should read --non-moving--.

Signed and Sealed this

Thirteenth Day of April, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,634,143 B2 | |
| APPLICATION NO. | : 11/122178 | |
| DATED | : December 15, 2009 | |
| INVENTOR(S) | : Yasushi Saito | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1257 days.

Signed and Sealed this
Twenty-second Day of March, 2011

David J. Kappos
*Director of the United States Patent and Trademark Office*